(12) United States Patent
Mahapatra

(10) Patent No.: US 9,618,351 B1
(45) Date of Patent: Apr. 11, 2017

(54) POWER SAVING DURING SENSOR-ASSISTED NAVIGATION

(71) Applicant: Amazon Technologies, Inc., Seattle, WA (US)

(72) Inventor: Abinash Mahapatra, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/669,585

(22) Filed: Mar. 26, 2015

(51) Int. Cl.
*G01C 21/10* (2006.01)
*G01C 21/36* (2006.01)
*G01C 21/34* (2006.01)

(52) U.S. Cl.
CPC ......... *G01C 21/3469* (2013.01); *G01C 21/10* (2013.01); *G01C 21/3605* (2013.01); *G01C 21/3626* (2013.01); *G01C 21/3667* (2013.01)

(58) Field of Classification Search
CPC .......................... G01C 21/10; G01C 21/3667
USPC ........................................ 701/412, 468, 469
See application file for complete search history.

(56) References Cited

U.S. PATENT DOCUMENTS

| | | | | |
|---|---|---|---|---|
| 5,412,389 A | * | 5/1995 | Olds | G01C 21/00 342/357.21 |
| 5,913,170 A | * | 6/1999 | Wortham | G01S 5/0263 342/357.31 |
| 6,556,832 B1 | * | 4/2003 | Soliman | H04W 16/18 342/357.31 |
| 2007/0093257 A1 | * | 4/2007 | McDougall | H04W 24/00 455/456.1 |
| 2007/0268177 A1 | * | 11/2007 | Ahmed | G01S 19/24 342/357.43 |
| 2014/0232593 A1 | * | 8/2014 | Varoglu | G01S 19/48 342/357.28 |

OTHER PUBLICATIONS

Author Unknown, "Inertial Sensors Boost Smartphone GPS Performance," MIT Technology Review, v1.13.05.10, 3 pages, (Nov. 7, 2013).
Author Unknown, "Sensors Overview," Available at: http://developer.android.com/guide/topics/sensors/sensors_overview.html, 11 pages, (printed Feb. 9, 2015).
Pei, "Sensor Assisted 3D Personal Navigation on a Smart Phone in GPS Degraded Environments," IEEE, 6 pages, (2011).
Saeedi, "Context-Aware Personal Navigation Using Embedded Sensor Fusion in Smartphones," ISSN Sensors, 14, pp. 5742-5767 (Mar. 25, 2014).

* cited by examiner

*Primary Examiner* — Yazan Soofi
(74) *Attorney, Agent, or Firm* — K&L Gates LLP

(57) ABSTRACT

Methods and apparatuses for power saving during sensor-assisted Global Positioning System (GPS) navigation using a mobile device are presented. The methods may include receiving location improvement data for a geographic location, the location improvement data including a value corresponding to improvement in accuracy for location data for the geographic location. The mobile device may utilize the location improvement data to determine whether to utilize inertial sensors in the mobile device to improve the accuracy of the position fix.

21 Claims, 14 Drawing Sheets

700

| %Improvement | Latitude | Longitude | %Improvement | Latitude | Longitude | %Improvement | Latitude | Longitude |
|---|---|---|---|---|---|---|---|---|
| 50% | 37.4466549 | -122.16066 | 20% | 37.4466549 | -122.16065 | 30% | 37.4466549 | -122.16064 | 50% | 37.4466549 | -122.16063 |
| 55% | 37.4466548 | -122.16066 | 30% | 37.4466548 | -122.16065 | 50% | 37.4466548 | -122.16064 | 60% | 37.4466548 | -122.16063 |
| 35% | 37.4466547 | -122.16066 | 40% | 37.4466547 | -122.16065 | 55% | 37.4466547 | -122.16064 | 10% | 37.4466547 | -122.16063 |
| 25% | 37.4466546 | -122.16066 | 24% | 37.4466546 | -122.16065 | 60% | 37.4466546 | -122.16064 | 10% | 37.4466546 | -122.16063 |
| 30% | 37.4466545 | -122.16066 | 10% | 37.4466545 | -122.16065 | 15% | 37.4466545 | -122.16064 | 10% | 37.4466545 | -122.16063 |
| 30% | 37.4466544 | -122.16066 | 5% | 37.4466544 | -122.16065 | 10% | 37.4466544 | -122.16064 | 20% | 37.4466544 | -122.16063 |
| 50% | 37.4466543 | -122.16066 | 0% | 37.4466543 | -122.16065 | 15% | 37.4466543 | -122.16064 | 25% | 37.4466543 | -122.16063 |
| 50% | 37.4466542 | -122.16066 | 10% | 37.4466542 | -122.16065 | 10% | 37.4466542 | -122.16064 | 20% | 37.4466542 | -122.16063 |
| 10% | 37.4466541 | -122.16066 | 10% | 37.4466541 | -122.16065 | 10% | 37.4466541 | -122.16064 | 15% | 37.4466541 | -122.16063 |
| 15% | 37.4466540 | -122.16066 | 20% | 37.4466540 | -122.16065 | 30% | 37.4466540 | -122.16064 | 15% | 37.4466540 | -122.16063 |

710

| Color Code | Latitude | Longitude | Color Code | Latitude | Longitude | Color Code | Latitude | Longitude | Color Code | Latitude | Longitude |
|---|---|---|---|---|---|---|---|---|---|---|---|
| Green | 37.4466549 | -122.16066 | Yellow | 37.4466549 | -122.16065 | Yellow | 37.4466549 | -122.16064 | Green | 37.4466549 | -122.16063 |
| Green | 37.4466548 | -122.16066 | Yellow | 37.4466548 | -122.16065 | Green | 37.4466548 | -122.16064 | Green | 37.4466548 | -122.16063 |
| Green | 37.4466547 | -122.16066 | Green | 37.4466547 | -122.16065 | Green | 37.4466547 | -122.16064 | Red | 37.4466547 | -122.16063 |
| Yellow | 37.4466546 | -122.16066 | Yellow | 37.4466546 | -122.16065 | Green | 37.4466546 | -122.16064 | Red | 37.4466546 | -122.16063 |
| Yellow | 37.4466545 | -122.16066 | Red | 37.4466545 | -122.16065 | Red | 37.4466545 | -122.16064 | Red | 37.4466545 | -122.16063 |
| Yellow | 37.4466544 | -122.16066 | Red | 37.4466544 | -122.16065 | Red | 37.4466544 | -122.16064 | Yellow | 37.4466544 | -122.16063 |
| Green | 37.4466543 | -122.16066 | Red | 37.4466543 | -122.16065 | Red | 37.4466543 | -122.16064 | Yellow | 37.4466543 | -122.16063 |
| Green | 37.4466542 | -122.16066 | Red | 37.4466542 | -122.16065 | Red | 37.4466542 | -122.16064 | Yellow | 37.4466542 | -122.16063 |
| Red | 37.4466541 | -122.16066 | Red | 37.4466541 | -122.16065 | Red | 37.4466541 | -122.16064 | Red | 37.4466541 | -122.16063 |
| Red | 37.4466540 | -122.16066 | Yellow | 37.4466540 | -122.16065 | Yellow | 37.4466540 | -122.16064 | Red | 37.4466540 | -122.16063 |

FIG. 7

POWER SAVING DURING SENSOR-ASSISTED NAVIGATION

BACKGROUND

Using navigation programs in mobile devices is becoming much more commonplace. Often, navigation programs rely on global positioning system (GPS) algorithms to determine an estimated location of the mobile device. Conventional GPS algorithms rely on timing data received from multiple GPS satellites identifiable within a line of sight to the mobile device in order to obtain a position fix that represents the estimated location. The estimated location of the mobile device may then be overlaid on a map obtained in connection with the navigation program, thereby showing a calculated position of the mobile device on a map of the navigation program. The navigation program may smoothly update the position of the mobile device on the map by regularly computing the estimated position of the mobile device as the mobile device moves, e.g., in a moving vehicle.

In some cases, the estimated location of the mobile device may be improved using additional data available in the mobile device. For example, various sensor data obtained from sensors built into the mobile device, such as accelerometers, gyroscopes, and barometers, may be utilized in the navigation program to improve the estimated location of the mobile device. However, there may be some drawbacks in utilizing the extra sensor data to obtain an estimated location, such as decreased battery life caused by the sensors' power consumption. Accordingly, there is a need for improved navigation systems and methods.

BRIEF DESCRIPTION OF DRAWINGS

Some embodiments are illustrated by way of example and not limitation in the figures of the accompanying drawings.

FIG. 7 provides examples of textual representations of location improvement data, according to some embodiments.

DETAILED DESCRIPTION

Figure 1:
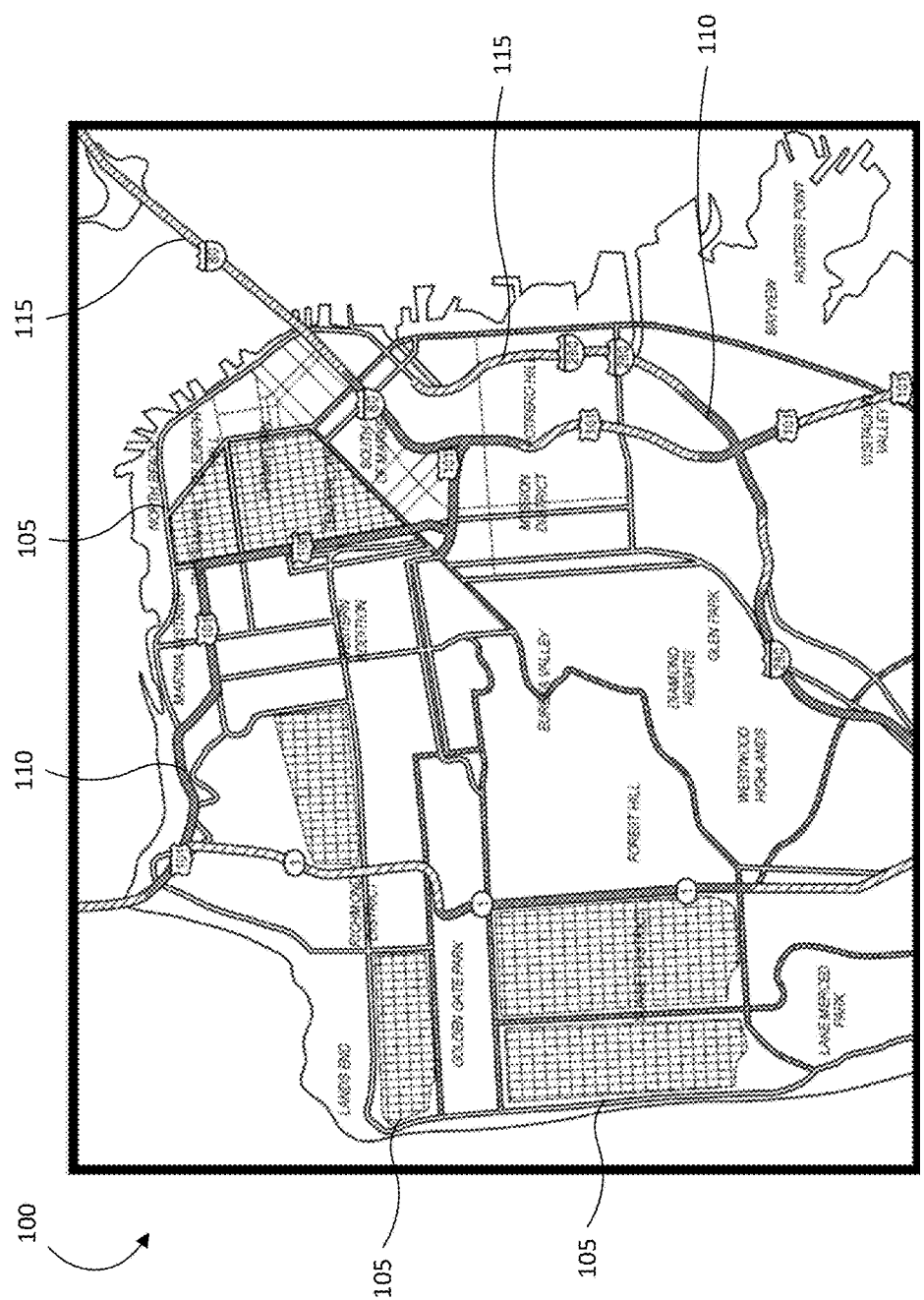
FIG. 1 shows an example visual representation of location improvement data for enhanced navigation, the visual representation displaying areas where utilizing sensor data may substantially improve GPS navigation, and where utilizing sensor data may not substantially improve GPS navigation, according to some embodiments.

In the following description, reference is made to the accompanying drawings that illustrate several embodiments of the present invention. It is understood that other embodiments may be utilized and mechanical, compositional, structural, and electrical operational changes may be made without departing from the spirit and scope of the present disclosure. The following detailed description is not to be taken in a limiting sense, and the scope of the embodiments of the present invention is defined only by the claims of the issued patent.

Methods, systems, and apparatuses for power saving during sensor-assisted navigation are presented. While incorporating sensor data into GPS navigation may improve the estimated location of a mobile device, constantly obtaining readings from the various sensors may also drain the mobile device's battery at an accelerated rate. In some cases, it may be more desirable to conserve battery life rather than utilize sensor data, such as when 20% of the battery life may be remaining, for example. Some navigation programs, e.g., Google Maps®, Mapquest®, etc., may allow a user to manually adjust settings to toggle the use of sensor data, either to always have sensors on or always have the sensors disabled. The sensor data may be derived from readings of sensors in a mobile device that may assist in improving GPS navigation. Examples of sensor data may include data from accelerometers, gyroscopes, compasses, and/or barometers built into the mobile device. However, it may be a more efficient use of battery life to toggle the sensor data on and off at certain times during navigation, e.g., automatically toggling the use of sensor data during a single route of navigation. For example, when in narrow streets or other narrow or crowded terrain, it may be worth using extra battery power to disambiguate the location of the mobile device by having the sensor data utilized. However, when on a long, straight road in a very sparse area, utilizing sensor data may not be necessary since improving the estimated location will most likely not change what road the mobile device is estimated to be on. Therefore, it may be desirable to automatically turn off the use of sensor data when the sensor data may not substantially improve navigation, and automatically turn on the use of sensor data when it is determined that the sensor data does substantially improve navigation.

In some embodiments, a method is presented for automatically toggling the use of sensor data during GPS navigation in a mobile device. For example, a mobile device may receive location improvement data from a centralized server indicating what streets or other areas in a geographic location may benefit from utilizing sensor data during navigation while on those streets. The location improvement data may therefore also explicitly or implicitly indicate what areas in the geographic location may not benefit from utilizing sensor data during navigation. Then, when using a navigation program, the mobile device may toggle on and off the use of sensor data in accordance with the location improvement data. In some embodiments, the mobile device may be configured to determine whether to utilize the sensor data based on determining whether the location improvement data satisfies a threshold criterion.

In some embodiments, a method is presented for generating the location improvement data at a centralized server and transmitting the location improvement data to one or more mobile devices. The location improvement data may be generated by data obtained from multiple mobile devices, for example. That is, in some embodiments, the method may include obtaining first location estimates at a particular location when sensor data is disabled, the first location estimates generated by multiple mobile devices at the particular location. In addition, the method may include obtaining second location estimates at the same particular location when sensor data is utilized, the second location estimates generated by the same or different multiple mobile devices at the particular location. A comparison between the first location estimates and the second location estimates may be performed, and any improvements by the second location estimates compared to the first location estimates may be recorded. The location improvement data at the particular location may be based on these comparisons. This type of comparison may be performed for multiple other locations, generated by multiple mobile devices. In some embodiments, the multiple comparisons at multiple locations may be expressed in several different ways, such as in a database, or in other cases in a heat map describing in two dimensions what geographic areas are actually improved by the use of sensor data and which are not. The compilation of this location improvement data may then be transmitted to a mobile device for use in sensor-assisted navigation.

Referring to FIG. 1, illustration 100 shows an example visual representation of location improvement data for enhanced navigation. The visual representation may show areas where utilizing sensor data may substantially improve GPS navigation, and where utilizing sensor data may not substantially improve GPS navigation, according to some embodiments. Here, the displayed map in illustration 100 may represent some roads and highways in the San Francisco Peninsula. Due to the many winding roads and highways in and around San Francisco, it may be desirable to utilize GPS navigation, and in particular sensor-assisted GPS navigation, if one does not know his way around the area. However, it may also be desirable to conserve as much battery life as possible in the mobile device utilizing the GPS navigation, because the user may also want to use his mobile device for other functions, such as calling contacts, looking up restaurants or tourist sites, and taking pictures or videos.

According to the map in illustration 100, certain roads in and around San Francisco may be closely spaced to other roads, or may even overlap due to highway overpasses, highway conjunctions, and the like. To help maintain or better establish an accurate location during GPS navigation, it may be beneficial to utilize sensor data when at or near these locations in the city. Examples of these areas may include the dense city streets as shown in the hashed areas 105, or some of the more crowded and densely packed highways as shown in the "colored" highways regions 110. As used herein, because the drawings may be displayed black and white, any terms about "color," "colored," or types of colors (e.g., green, red, etc.) may also be in reference to black and white, filled-in patterns in the drawings simulating a non-black-and-white color in the visible spectrum, or other representation of different designations within the map. For example, a filled-in area of horizontal and vertical lines may be referred to as a "colored" area.

On the other hand, the accuracy estimates of sensor-assisted GPS navigation may not be substantially different from GPS navigation without sensor data on certain roads, when for example, an improved location estimate may not change what road the user may possibly be driving on. For example, while on a bridge crossing the San Francisco Bay, enabling the sensor for use in navigation may not substantially improve the location estimate of the mobile device. In other cases, even if it did, the improved location estimate may not change substantially the navigation route of the mobile device. Thus, in some embodiments, the example heat map of illustration 100 may also include certain roads or highways that allow the sensors to be disabled during navigation, illustrated herein by the diagonally highlighted roads 115.

Thus, in some embodiments, as the mobile device is used for GPS navigation along these highways and roads according to the heat map in illustration 100, the mobile device may be configured to turn on one or more inertial sensors for use in navigation when the mobile device's location, as judged by the location estimate, passes through the hashed areas 105 or the colored regions of the highways 110. In addition, the mobile device may be configured to disable the sensors for use in navigation when the location estimate passes through the diagonally highlighted roads 115. For example, when a vehicle that has the mobile device is determined to be in one of these predesignated areas where sensor assisted navigation would help (e.g., the hashed areas 105), the mobile device may be configured to turn the sensors on to assist with location determination and turn off the sensors if the vehicle is determined to be in a location where sensor assistance does not help (e.g., the diagonally highlighted roads 115).

Figure 2:
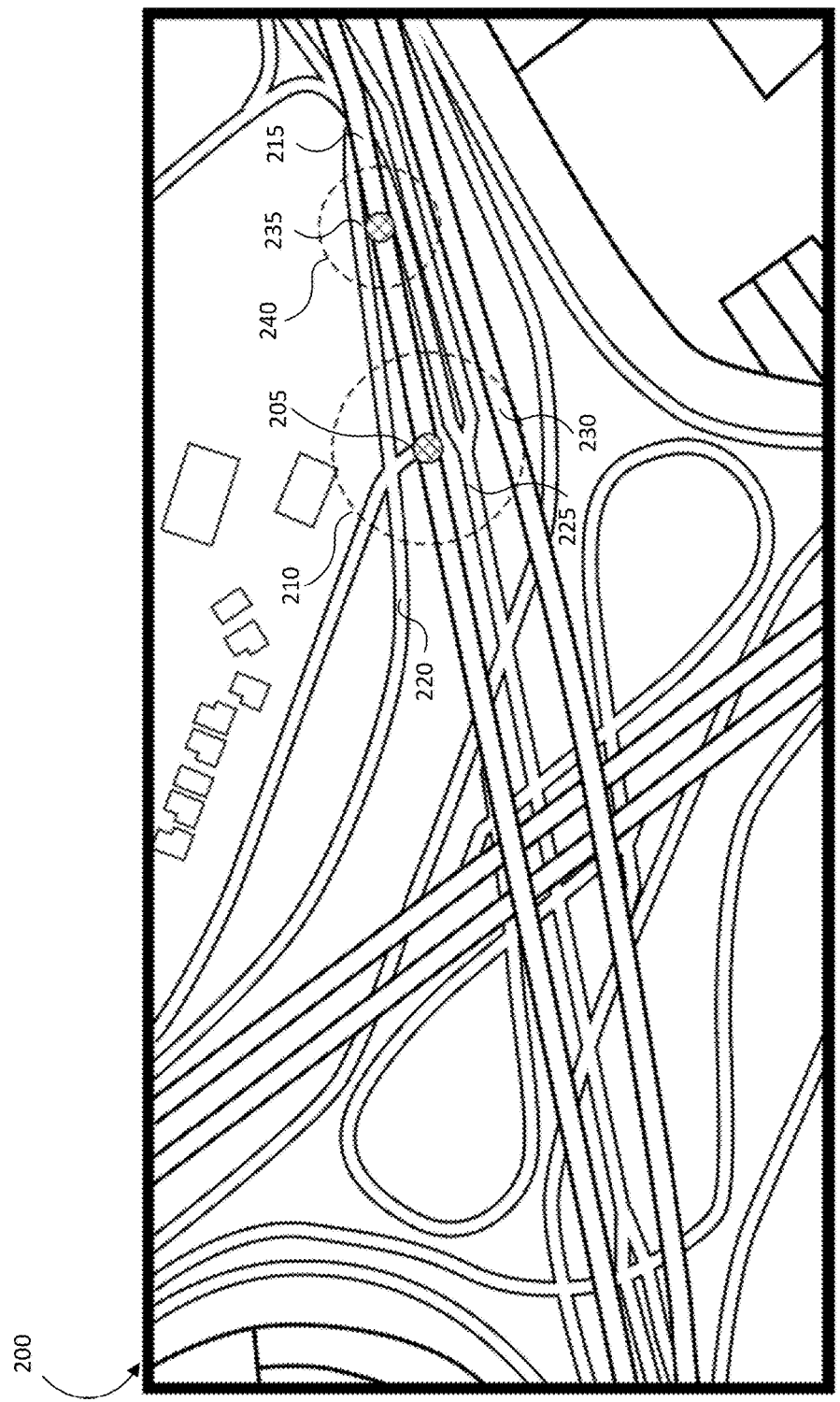
FIG. 2 provides an example scenario of a difference between location accuracy during GPS navigation with and without the use of sensor data, according to some embodiments.

Referring to FIG. 2, illustration 200 provides an example scenario for utilizing sensor data during GPS navigation, according to some embodiments. Illustration 200 may represent a map of two intersecting highways, including the winding and looping roads transitioning from one highway to the other. Here, the hashed circle 205 may represent the estimated location of a mobile device of a user during GPS navigation, such as when a mobile device is inside a moving vehicle. Relying on GPS without the use of sensor data of the mobile device, a GPS navigation program may display the location of the mobile device as being the hashed circle 205. However, the estimated location oftentimes includes an error range 210, indicating a wider range of where the actual location of the mobile device may be. For example, the error range 210 may indicate that the GPS navigation program is 95% certain that the mobile device is actually within the circle formed by the error range 210, and the estimated location 205 may be merely a best guess of where the mobile device is within the error range 210. In other words, the mobile device may actually be located on any of the roads 215, 220, 225, or 230, within the radius of the error range 210. Quantitatively, the error range 210 may be expressed as having a 20 meters radius of uncertainty, for example. In conventional navigation programs, the error range 210 may not typically be displayed or visually available to the user, and this calculation is oftentimes computed in the background. In some embodiments, the calculation of the error range 210 may be based on the uncertainty in the timing readings of the multiple GPS satellites in view, the number of GPS satellites in view, the measured GPS signal strength of the mobile device used to obtain these readings, and other causes of error ascertainable by those with skill in the art.

In some cases, techniques for reducing the error range of an estimated location may help better ascertain where the actual location of the mobile device is during GPS navigation. For example, the hashed circle 235 may represent the estimated location of the mobile device of the user during GPS navigation using data from various sensors of the mobile device. The estimated location at hashed circle 235 may have an associated error range 240. Examples of sensor data may include data from one or more accelerometers, one or more gyroscopes, one or more compasses, and/or one or more barometers built into the mobile device. The use of the sensor data may improve the GPS positioning by helping to determine when a vehicle containing the mobile device is turning, gaining speed, rising or falling in elevation, going straight, or experiencing other kinds of directional movement. Helping to reduce this kind of uncertainty may help to generate a smaller error range 240. Here, the error range 240 may be quantitatively expressed as having a radius of uncertainty of 10 meters, for example. Compared to the error range 210 having a radius of uncertainty of 20 meters, the error range 240 may be smaller due to the sensor data providing more disambiguating information in this more narrow, more winding or curving portion of freeway. Therefore, as shown, the actual location of the mobile device using sensor data in GPS navigation may be any of roads 215, 220, and 225.

In this example, it is apparent that the GPS navigation may benefit from enabling the sensors during navigation, at least because enabling the sensors during navigation would eliminate the possibility that the mobile device is located on road 230. In general, due to the roads being located closely to each other in this highway intersection, combined with the curving and winding nature of the highway conjunctions, a GPS navigation program may benefit from sensor data in at least this area. From a quantitative perspective, the accuracy improvement by utilizing sensor data may be the error range with sensor data divided by the error range without sensor data, e.g., 1-10 m/20 m=50% change or improvement, in this example. In other cases, the accuracy improvement by utilizing sensor data may be based on an absolute value of improvement, e.g., 20 m-10 m=10 m change or improvement, in this example.

Figure 3:
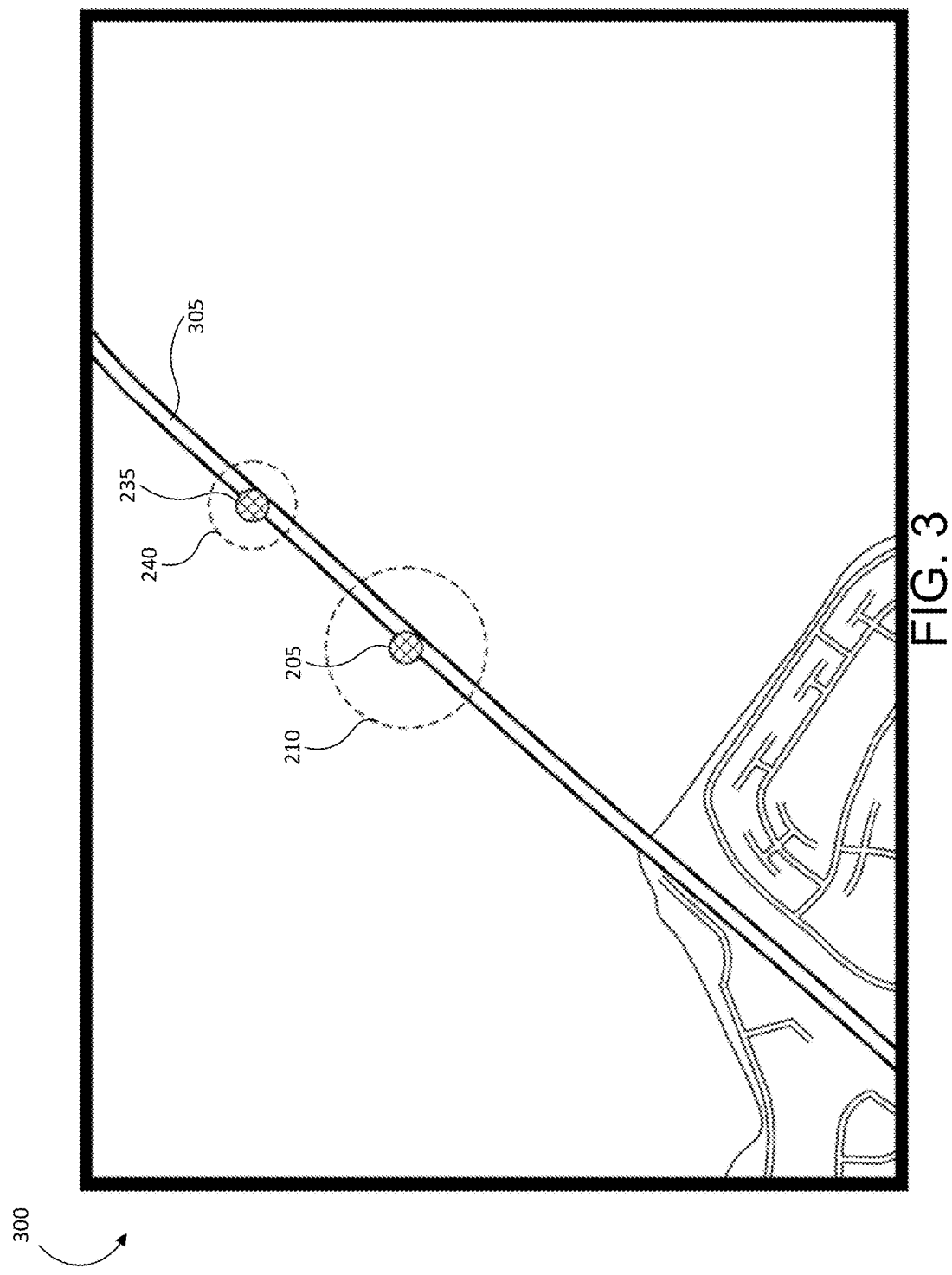
FIG. 3 provides another example scenario of a difference between location accuracy during GPS navigation with and without the use of sensor data, according to some embodiments.

Referring to FIG. 3, illustration 300 provides an example scenario for when sensors may be disabled during GPS navigation, according to some embodiments. Here, illustration 300 may show a map of highway 305 of part of a bridge crossing water, such as the San Francisco Bay. As before, the hashed circle 205 may represent the estimated location of a mobile device in a vehicle using GPS navigation with sensors disabled. The error range 210 may be associated with the estimated location 205 and with having sensors disabled. In this case, even with a wider error range 210, there is only one likely possibility of where the mobile device may be located. That is, the mobile device may be traveling on a portion of the bridge 305, with no other possible roads falling within the error range 210.

Similarly, the hashed circle 235 may represent the estimated location of the mobile device in a vehicle using GPS navigation utilizing sensor data while driving on the bridge 305. In some cases, the error range 240 of the estimate location may be smaller due to the sensor data being utilized during navigation. However, because the user may be driving on the bridge with no other alternative roads in the vicinity, having a smaller error range may be moot, because a more precise estimate location may not practically change the results of the GPS navigation program. In these cases, it may be more desirable to disable use of the sensors in order to conserve battery life since utilizing sensor data may have no practical improvement.

In other cases, due to the bridge having no other alternative roads in the vicinity, the error range 240 when utilizing sensor data may not actually be much smaller, if at all, compared to the error range 210 with sensors disabled. Thus, an alternate reason for disabling sensors during navigation is that in some cases, the actual sizes of the error ranges with sensors turned on versus sensors disabled may not vary by much while on the bridge 305. For example, the error range 210 may have a 20 m radius around the hashed circle 205, while the error range 240 may have a 17 m radius around the hashed circle 235. In this example, the improvement of using the sensor data during GPS navigation may therefore be 1-17 m/20 m=15% change or improvement. In some cases, with a minor improvement in location estimation, or even no improvement at all, it may be more desirable to disable use of the sensors in order to conserve battery life.

Figure 4:
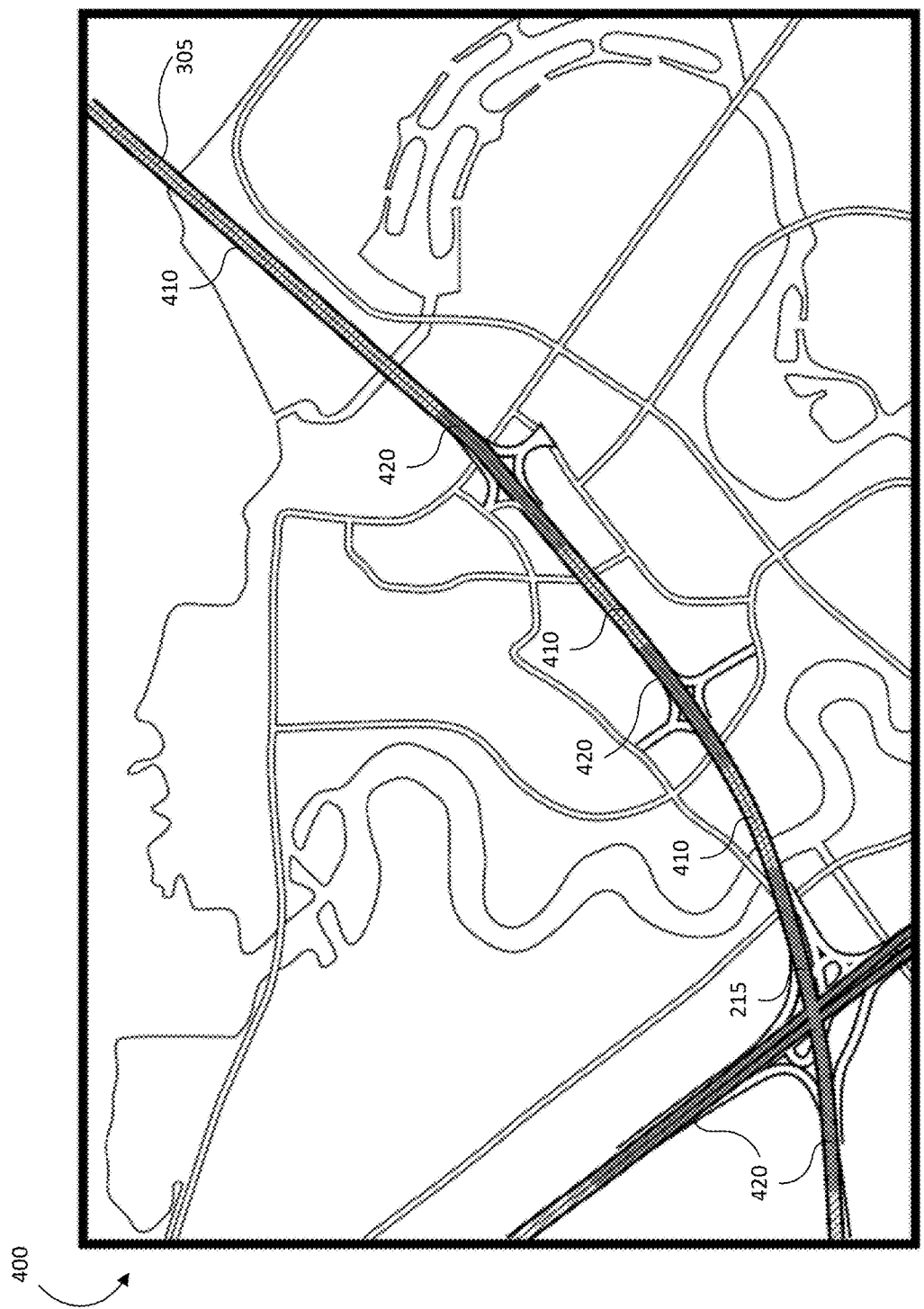
FIG. 4 shows an example visual representation of location improvement data for enhanced navigation showing areas where sensor data is used and areas where sensor data is not used to enhance GPS location fix, according to some embodiments.

Referring to FIG. 4, illustration 400 shows an example visual representation of location improvement data for two sections of highway. The visual representation illustrates areas/location in which a mobile device may utilize sensor data and areas/locations in which the mobile device may not use sensor data to augment GPS-based navigation. The illustration 400 references some parts of the descriptions associated with illustrations 200 and 300, referring to the road 215 near the crossing highway conjunctions, and the highway portion across the bridge 305. Here, the hashed markings 410 on the highway may indicate areas where it has been determined that use of the sensor data can be turned off during GPS navigation, in order to save more battery life. For example, it may have been determined that turning on use of the sensor data at these junctions in the highway did not substantially improve location estimates, or that even with substantially improved location estimates, GPS navigation would not be substantially different. These determinations may have been derived from, for example, data received from multiple devices that had previously navigated through these junctions. This data can be analyzed and used to generate the location improvement data indicating how the use of sensor data improved location estimates at these junctions. In addition, the colored areas 420 on the highway may indicate areas where it has been determined that use of the sensor data should be utilized during GPS navigation to improve navigation in these areas at a cost of using more battery life. For example, it may have been determined that turning on use of the sensor data at these junctions in the highway did help in substantially disambiguating two or more roads from one another, and or that location estimates were substantially improved during GPS navigation. The use of data obtained from a large number of sources is sometimes referred to as crowdsourcing, so the determinations may be derived from crowdsourced data obtained from a large group of mobile device users.

For the sake of clarity and by way of example, only two highway portions in illustration 400 have been highlighted with areas distinguishing between whether sensor data should be utilized or disabled. However, some or all of the other remaining roads in the illustration 400 may also be highlighted with the same kind of information, and embodiments are not so limited.

In some embodiments, location improvement data indicating improvements in location estimation through the use of sensor data at the locations in illustration 400 may be transmitted to a mobile device. The mobile device may then render a heat map on its display, based on the location improvement data, and may use the location improvement data to help determine when sensor data should be utilized or not, even while on the same stretch of road. In other cases, non-graphical representations of a heat map like those in illustration 400 may be transmitted to the mobile device for use in GPS navigation, and a heat map need not be rendered on the display during navigation. An example of a non-graphical representation will be described more below.

In some embodiments, the location improvement data, expressed either graphically or with textual information, may be generated by a centralized computer server configured to receive data from and transmit data to multiple mobile devices. In some cases, the centralized computer server may be configured to generate the location improvement data through crowdsourcing from multiple mobile devices. For example, a first mobile device may determine its location both with and without the use of sensor data. The first mobile device may also be configured to determine an error range or other statistical measure of accuracy associated with that particular estimated location. The first mobile device may then transmit its estimated location and the determined error range to the centralized server, along with an indicator informing the centralized server that these readings were obtained using GPS navigation and with no sensor data. That same first mobile device or other multiple mobile devices may perform similar location calculations and may upload their estimated locations, associated error ranges, and flags indicating whether sensor data was utilized or not to the centralized server, thereby providing the centralized server with multiple data points of the accuracy of GPS location fix without use of sensor data at that particular coordinate or region.

At other times, the first mobile device may also be configured to determine an estimate of its location at that same coordinate or region using GPS navigation and utilizing sensor data. The first mobile device may then determine a different error range associated with that particular estimated location. This estimated location and the determined error range when utilizing sensor data may also be transmitted to the centralized server, along with an indicator informing the centralized server that these readings were obtained using GPS navigation and utilizing sensor data. That same first mobile device or other multiple mobile devices may perform the same location calculation at that particular coordinate utilizing sensor data, and may upload these estimated locations, associated error ranges, and flags indicating whether sensor data was utilized or not to the centralized server.

In some embodiments, mobile devices may also be configured to transmit data indicating a level of GPS signal strength or a number of GPS satellites used to determine its location fix, to the centralized server. These types of metadata may provide additional context for the accuracy of the error ranges at the associated estimated locations. The centralized server may categorize the estimated locations and associated error ranges based on commonalities in the metadata.

Having obtained at least one location estimate and associated error range at the particular location with sensors disabled, and at least one location estimate and associated error range at that particular location when utilizing sensor data, the centralized server may be configured to measure a degree of improvement comparing the location estimate when utilizing sensor data to the location estimate with sensors disabled. For example, the degree of improvement may be determined as:

$$\text{Degree of Improvement} = 1 - \frac{\text{error range of location estimate using sensor data}}{\text{error range of the location estimate without sensor data}}$$

In some embodiments, the degree of improvement may be compared to a specified threshold criterion, in order to determine whether it is desirable to utilize sensor data or leave the sensors disabled at that particular location. For example, the threshold criterion may express that sensor data should be utilized if sensor data improves the accuracy of the location estimate by 40% or more. As another example, the threshold criterion may express that sensor data should be utilized if sensor data reduces the average error range by 10 m or more. In some embodiments, if the degree of improvement satisfies the specified threshold criterion, then the centralized server may determine that sensor data should be utilized at that location. In some cases, the server may adjust in the location improvement data the designation to utilize sensor data at that location accordingly, e.g., that location on the map may be colored similar to the sections of road 420. Similarly, if the degree of improvement does not satisfy the specified threshold criterion at a particular location, then the server may adjust in the location improvement data at that location to disable the sensors, e.g., that location on the map may be colored with hashed markings similar to the sections of road 410. This process may be duplicated for all other locations on the map, until the location improvement data is comprehensively populated.

In some embodiments, the centralized server may obtain multiple readings at the same location from multiple mobile devices to better determine location accuracy. This process may be performed for many other locations on a map, ultimately generating location improvement data that can be utilized to render a heat map like in illustration 400 or be expressed as some other kind of data set comparing the efficacy of navigating when utilizing sensor data versus navigating with sensors disabled.

In some embodiments, the server generating the location improvement data may also be configured to assign varying levels of confidence to different portions of the location improvement data. The levels of confidence may be based on, for example, an amount of crowdsourced data received by the server regarding a particular location. For example, if the server has received only one accuracy measurement from one mobile device at a first location, the server may assign a low level of confidence as to the accuracy of the determination for whether to turn on sensors at the first location. As another example, if the server has received 100,000 accuracy measurements at a second location, the centralized server may assign a high level of confidence as to the accuracy of determining whether to turn on sensors at the second location. These confidence values may also be transmitted to mobile devices, so as to allow the mobile device the ability to better determine whether to utilize the location improvement data at any particular location.

In some embodiments, the server may also categorize the crowdsourced data based on a level of sophistication of the sensors used to generate the crowdsourced data. For example, multiple mobile devices may also transmit to the centralized server the make and model of the mobile device or the type of sensors known to be used when generating the location estimates and accuracy measurements. The server may be configured to determine the level of sophistication or accuracy of the sensors based on this information, and may subsequently divide the crowdsourced data into different tiers of accuracy based on the level of sophistication of the sensors from the crowdsourced mobile devices. For example, data identifying a particular model of the mobile device may be transmitted to the centralized server, and the centralized server would then determine that the mobile device does not have a barometer for use in GPS navigation (e.g., by retrieving technical specifications about that model from a database of mobile device specifications). The centralized server may categorize these readings into a group of crowdsourced data that does not utilize barometers during assisted GPS navigation. The server may then be configured to transmit location improvement data based on this group of crowdsourced data to mobile devices that the server has determined also do not use barometers during sensor-assisted GPS navigation. In other cases, the centralized server may transmit some or all different versions of location improvement data based on these different crowdsourced categorizations, thereby allowing the mobile device to select which sets of location improvement data to use during GPS navigation based on the mobile device's capabilities.

In some embodiments, instead of crowdsourcing, analysts or other intelligent algorithms may annotate a heat map, or modify the location improvement data used to render the heat map, with indications specifying when sensor data should be utilized. For example, before enough data from crowdsourcing is obtained, the areas around the two highway conjunctions 215 may be reasoned to need sensor data to be utilized, and thus this area may be highlighted to reflect that sensor data should be utilized. Similarly, it may be reasoned that use of sensor data may be turned off when crossing the bridge 305, and thus the area around the bridge 305 may be highlighted to reflect that sensor data should not be utilized. Other manual annotations may be made to any and all areas, based on the above analysis or other types of analyses apparent to those with skill in the art, and embodiments are not so limited.

Figure 5:
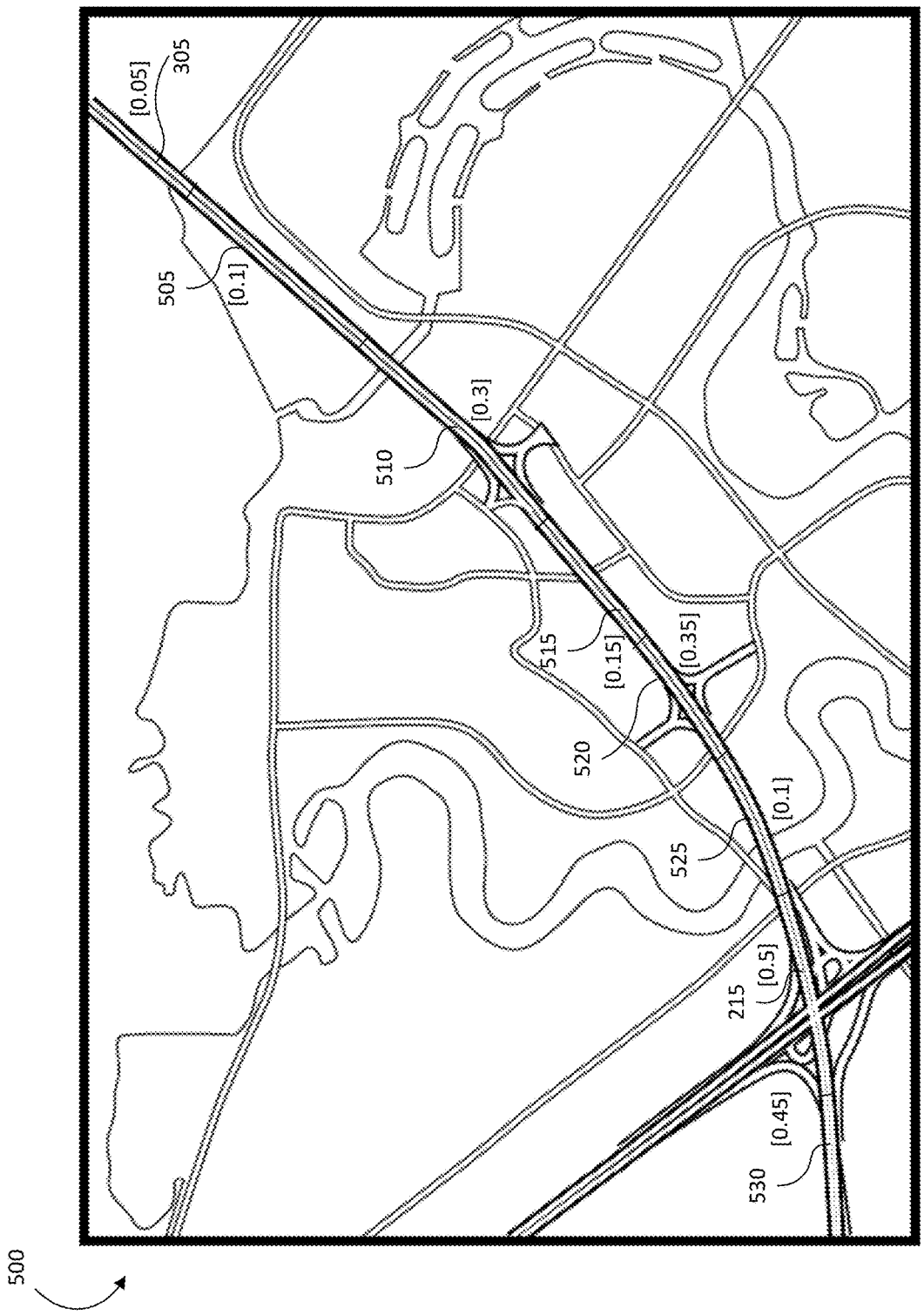
FIG. 5 shows another example visual representation of map data illustrating when to utilize sensor data or disable use of the sensors during GPS navigation in a mobile device, according to some embodiments.

Referring to FIG. 5, illustration 500 shows another example visual representation of location improvement data illustrating when to utilize sensor data during GPS navigation in a mobile device, according to some embodiments. Illustration 500 may show the same portions of road as in illustration 400, but in conjunction with textual information about the effectiveness of utilizing sensor data, rather than showing a graphical representation. Here, the numbers in brackets may represent an average quantitative degree of improvement along an associated section of highway. For example, the bridge section 305 may have an associated location improvement of 0.05, or 5%, when sensor data is utilized compared to when use of sensor data is turned off during GPS navigation. Similarly, the highway section 505 may have an associated location improvement of 0.1, or 10%. The highway section 510 may have an associated location improvement of 0.3, or 30%. The highway section 515 may have an associated location improvement of 0.15, or 15%. The highway section 520 may have an associated location improvement of 0.35, or 35%. The highway section 525 may have an associated location improvement of 0.1, or 10%. The highway section 215 may have an associated location improvement of 0.5, or 50%, while the highway section 530 may have an associated location improvement of 0.45, or 45%, when sensor data is utilized compared to when use of sensor data is turned off during GPS navigation.

In some embodiments, this location improvement data may be similarly generated via crowdsourcing, with the location improvement data associated with each of these sections 505, 510, 515, etc., expressed as the average improvement of multiple readings by multiple mobile devices. In some embodiments, instead of the location improvement data being expressed in percentages, the data may be expressed in absolute value, for example, the number of meters by which the error range has been reduced. In some embodiments, each of the sections of road may be more finely or broadly subdivided, and embodiments are not so limited.

This location improvement data, along with their associated coordinates, e.g., expressed in latitude and longitude coordinates, for example, may be transmitted to a mobile device. Here, unlike the heat map in illustration 400, a mobile device may be configured to process the location improvement data used to render the heat map of illustration 500 through one or more of its own threshold criteria before determining whether to utilize sensor data during GPS navigation. For example, a first mobile device may have a threshold criterion of 0.3 or 30%, meaning the mobile device will utilize sensor data when the location improvement data shows that its location estimation at a particular location can be improved by 0.3 or 30% or better. A second mobile device may have a threshold criterion of 0.5 or 50%, meaning the mobile device will utilize sensor data when the location improvement data shows that its location estimation can be improved by 0.5 or 50% or better. In some embodiments, a GPS navigation program on the mobile device may allow the user to specify the threshold criterion for turning on and off use of sensor data. In this way, the type of data provided in the location improvement data underlying the heat map in illustration 500 may allow a user more flexibility in determining when to turn on or off use of sensor data during GPS navigation.

In some embodiments, a heat map expressing location improvement data may also be based on one or more additional conditions affecting the measurements of the location improvement data. For example, the location improvement data in illustration 500 may be based on the mobile devices having a certain level of signal strength from GPS satellites in view, and/or may be based on the mobile device receiving GPS data from at least seven GPS satellites. The example numbers in illustration 500 may change if one or more of these conditions changes. For example, if signal strength to GPS satellites is weaker, say due to cloud cover or inclement weather, then the use of sensor data may be even more significant, causing the location improvement data to probably be even more useful on average in these conditions. As another example, if only four GPS satellites are within a line of sight of the mobile device, the error ranges of the GPS navigation alone may be quite large, causing the location improvement data to probably be even higher on average in these conditions (due to the use of sensor data being more significant).

As such, in some embodiments, multiple versions of location improvement data, expressed either in heat maps or with non-graphical means, may be provided and/or generated for the same geographic region, each of the versions based on a change in one or more conditions about the calculations derived from the mobile device. In some embodiments, more than one of the multiple versions of the location improvement data may be sent to the mobile device and used according to the methods presented herein. In some embodiments, the mobile device may be configured to switch between different sets of location improvement data, based on the changing conditions of the mobile device during GPS navigation.

Figure 6:
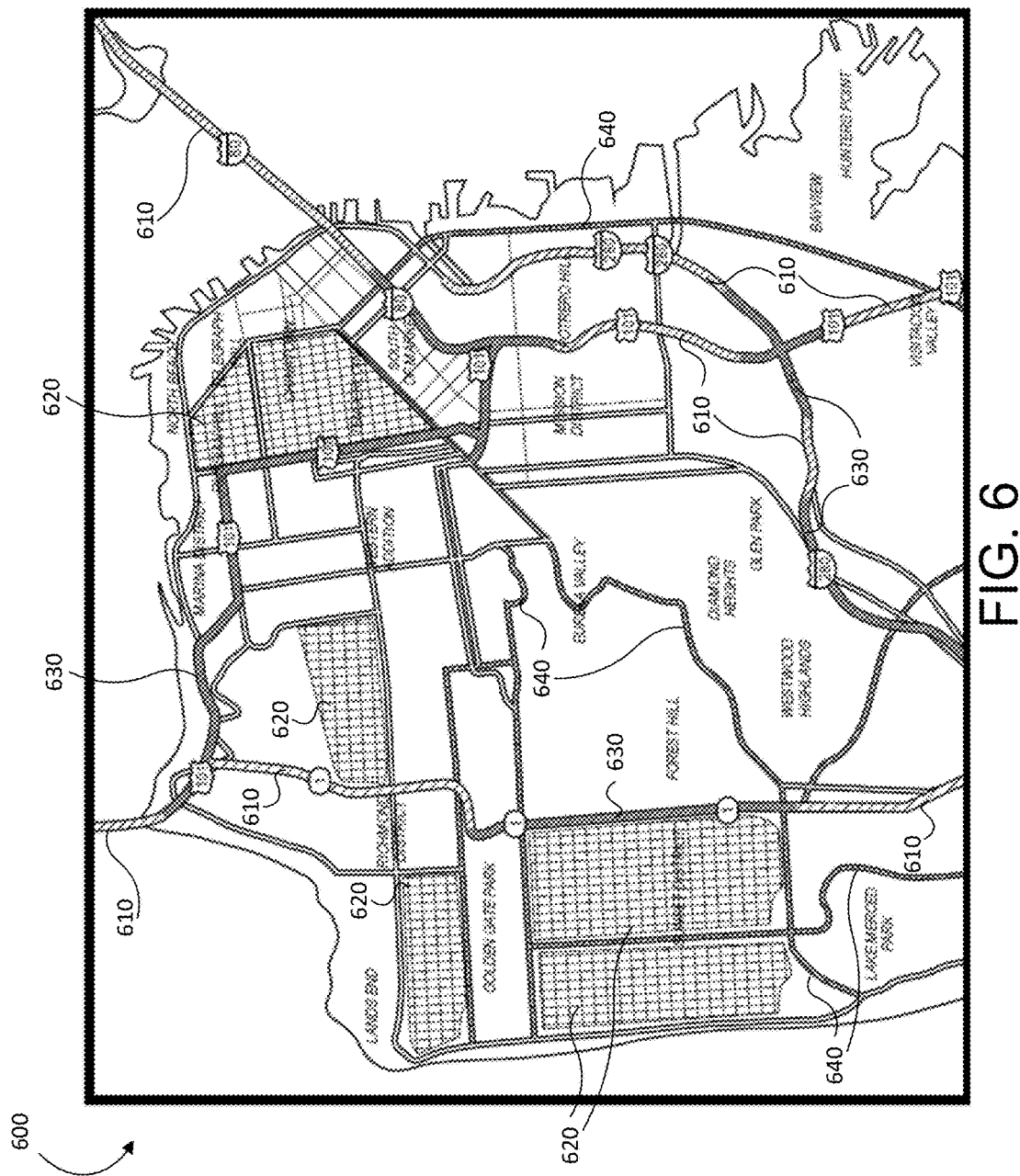
FIG. 6 shows a more complicated example of a visual representation of location improvement data for enhanced navigation, showing areas where sensor data is conditionally used based on satisfying a criterion, according to some embodiments.

Referring to FIG. 6, illustration 600 shows an example visual representation of a more complicated example of location improvement data for when to turn on or off use of sensor data during GPS navigation. Areas are shown where sensor data is conditionally used based on satisfying a criterion, according to some embodiments. Here, four different shadings are represented in the heat map of illustration 600. For example, the roads with diagonal markings 610 may represent areas where use of sensor data is not necessary under most or all circumstances, in some embodiments. These roads 610 may have been determined not to experience much of an improvement, if at all, when utilizing sensor data during GPS navigation. In contrast, the roads with vertical and horizontal hash markings 620 may represent areas where sensor data should always be utilized. Due to the spatial density of these roads 620, it may have been determined that sensor data substantially improves GPS navigation in most or all circumstances. In addition, the roads 630 with filled in highlighting may represent areas that may be more conditionally turned on, depending on one or more circumstances present during GPS navigation. For example, it may have been determined that utilizing sensor data when on these roads 630 delivers a moderate improvement to location estimation, and may not be necessary in all circumstances. For example, if the battery of the mobile device is low, e.g., 20% or less, use of sensor data may be turned off when on the road 630, but may otherwise be turned on. Furthermore, in some embodiments, a fourth circumstance may be allowed, based on whether a second condition has been satisfied, as represented by the roads 640 with speckled highlighting. For example, it may be specified that use of sensor data may be turned on for roads 640 when signal conditions are poor during GPS navigation. For example, only the minimum of four GPS satellites may be in view during that time, and/or the signal strength to those satellites may be weak, based on low cloud cover or intermittent line of sight. At all other times while on road 640, the use of sensor data may be turned off.

In some embodiments, the examples of using multiple threshold criteria may be applied similarly to the location improvement data underlying the heat maps, using textual data rather than the graphical depictions in illustration 600. For example, referring to the percentage improvements discussed in illustration 500, multiple layers of threshold criteria may be applied to determine when sensor data should be utilized. For example, a first threshold criterion may be specified that sensor data should be utilized when the location estimate is improved by 50% or more. A second threshold criterion may be specified wherein sensor data should be utilized when the location estimate is improved by 30% or more and when there are only four GPS satellites in view. As another example, a third threshold criterion may be specified wherein use of sensor data should be turned off when the location estimate is not improved by more than 60% and the battery of the mobile device is 20% or less.

In some embodiments, a mobile device may be configured to receive more than one kind of location data or more than one set of maps in the location improvement data being used to express more than one kind of heat map. For example, the mobile device may be configured to download location improvement data that can be used to render a simplified heat map having only "on" and "off" criteria for when to toggle use of sensor data, and may also download location improvement data illustrative of a more data-intensive heat map specifying the percentage improvements, like the heat map in illustration 500. In addition, in some embodiments, the mobile device may be configured to download location improvement data that can express a heat map like in illustration 600, having multiple layers of criteria, on top of already downloading other kinds of heat maps for the same region. In some embodiments, these different options may allow a user to specify various settings for how he wishes to have sensor data utilized during GPS navigation.

Referring to FIG. 7, charts 700 and 710 provide examples of non-graphical location improvement data, according to some embodiments. The data in charts 700 or 710 may be used to generate the graphical representations in illustrations 400, 500, and 600, for example. In other cases, the data in charts 700 and 710 may be downloaded directly by a mobile device and utilized by the device to determine when to toggle the use of sensor data during GPS navigation.

The chart 700 provides a two-dimensional table of "triplet" data, with each "triplet" including a latitude coordinate, a longitude coordinate, and a percentage indicating a percent improvement at that coordinate when sensor data is utilized compared to when use of sensor data is turned off. The two-dimensional table may be organized to mirror traversing a geographic region, e.g., moving vertically down the chart corresponds to moving south in latitude, while moving horizontally to the right corresponds to moving east in longitude.

Similarly, the chart 710 provides a two-dimensional table of triplet data, but this time with a color code matched with a latitude and longitude coordinate instead of the percentages provided in chart 700. In this case, the color code "green" may signal to the mobile device to always utilize sensor data, while the color code "red" may signal to the mobile device to always disable use of the sensors at that coordinate. The color code "yellow" may allow the mobile device to turn on or off sensor data based on a condition, such as satisfying a threshold criterion. The color codes herein are merely examples, and the codes could be reversed such that "red" means to always utilize sensor data, etc. Certainly, other types of distinctions besides these example colors may be used, and embodiments are not so limited.

Figure 8A:
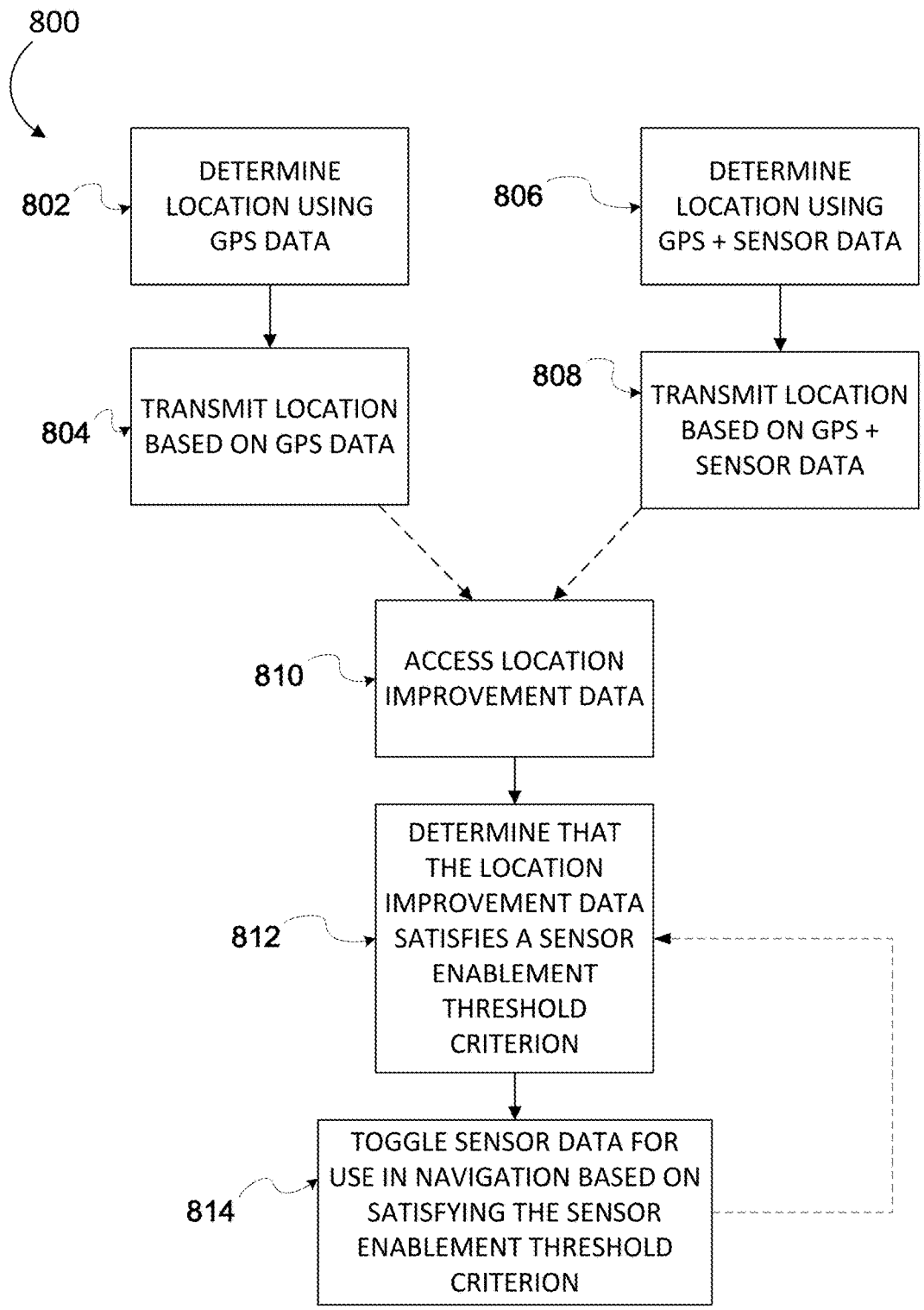
FIGS. 8A-8B represent example methodologies for performing methods of a mobile device, according to aspects of the present disclosure.

Referring to FIG. 8A, the flowchart 800 represents an example methodology for a mobile device performing a method to toggle sensors on or off during GPS-based navigation. The flowchart 800 may be consistent with the example embodiments provided herein, including for example, the descriptions in FIGS. 1-7.

In some embodiments, the method may start at block 810, wherein the mobile device may access location improvement data providing information to determine whether to utilize sensor data during GPS navigation. In some embodiments, the mobile device may download the location improvement data from a server centrally storing this information. In other cases, this information may already have been downloaded by the mobile device and may be accessed in nonvolatile memory of the mobile device. Examples of the location improvement data may include data used to render a heat map including information similar to any of illustrations 100, 400, 500, and/or 600, and any other variants apparent to those with skill in the art. In some embodiments, the location improvement data may include the non-graphical information similar to those provided in charts 700 or 710, or other variants apparent to those with skill in the art. In some cases, the location improvement data may include combinations or multiple versions of any of the types of location improvement data described herein, and embodiments not so limited.

At block 812, the mobile device may then determine that the location improvement data at a particular estimated location satisfies a sensor enablement threshold criterion. The sensor enablement threshold criterion may represent a threshold delineating when sensor data is to be utilized during GPS navigation and when sensor data is not. Examples of the sensor enablement threshold criterion may include any of the descriptions in FIGS. 4-6, including for example, that the estimated location has an error range that is improved by a predetermined percentage, or simply that the location improvement data matches a criterion that says to utilize sensor data at the particular estimated location. In some embodiments, the sensor enablement threshold criterion can be more complex, combining additional rules or conditions, such as determining if the battery life of the mobile device is low, how many satellites are in view of the mobile device, what is the signal strength of the mobile device, etc., and embodiments are not so limited.

At block 814, a mobile device may be configured to toggle sensor data for use in GPS navigation based on satisfying the sensor enablement threshold criterion. That is, the mobile device may utilize sensor data if sensor data was previously turned off during GPS navigation, or vice versa. In some embodiments, the actions in blocks 812 and 814 may be repeated continuously at different locations as the mobile device is moving during GPS navigation.

In some embodiments, the example methodology may include steps preceding the actions in block 810. For example, in some cases, the mobile device may also be configured to determine an estimated location using GPS data and without any sensor data turned utilized, at block 802. The estimated location of the mobile device based on this measurement may be transmitted, in some cases to a centralized server or other data collecting body, at block 804. In some embodiments, an accuracy measurement of the estimated location may also be transmitted. The accuracy measurement may include for example an error range like error range 210. The actions described in block 802 and 804 may be used to crowdsource generation of the location improvement data, in some embodiments. The method of the mobile device may then proceed to block 810 as described above, in some embodiments.

In some embodiments, the example methodology may also include determining an estimated location using GPS data and sensor data, at block 806. Then at block 808, the estimated location based on the GPS and sensor data may be transmitted to the centralized server or other data collecting body. This information may also contribute to generating the location improvement data, in some embodiments. In some cases, the mobile device may perform blocks 802-808 before proceeding to block 810.

Figure 8B:
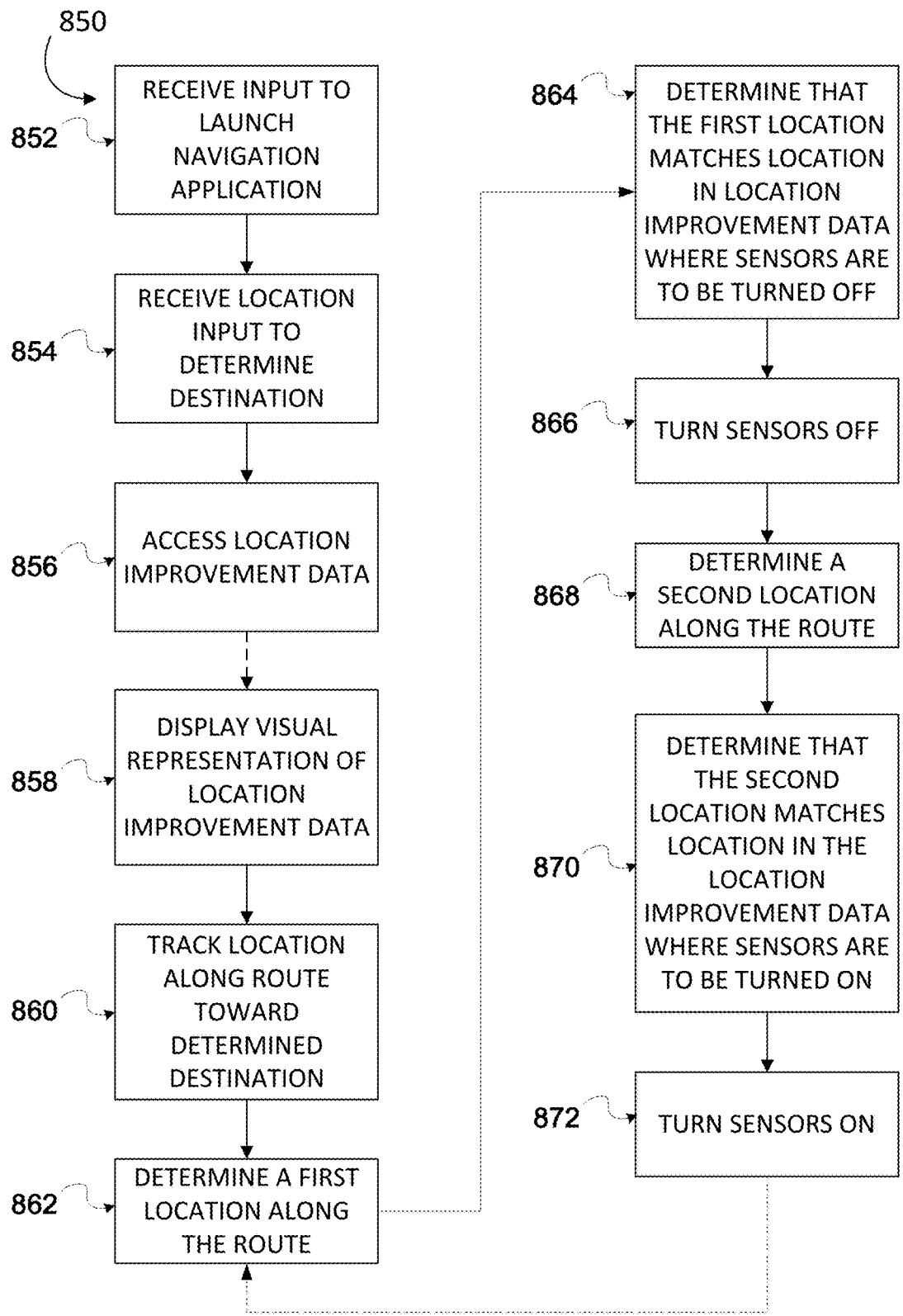

Referring to FIG. 8B, the flowchart 850 represents another example methodology for a mobile device performing a method to toggle sensors on or off during GPS-based navigation. At block 852, the mobile device may receive an input to launch a navigation application. For example, a user of the mobile device may click or tap on the mobile device to activate the navigation application. Examples of navigation applications include MapQuest®, Google Maps®, Yahoo Maps®, and the like.

At block 854, the mobile device may receive location inputs to determine a destination to navigate to in the navigation application. For example, a user may type in an address into the navigation application, designating where the user would like to see a route to. The mobile device may then determine a route to the location based on the location input.

At block 856, the mobile device may then access location improvement data. The location improvement data may indicate what locations along the route are suitable for utilizing sensors with the navigation application and what locations along the route should not utilize the sensors. In some embodiments, the mobile device may access this location improvement data through accessing an internal database in the mobile device having already stored the location improvement data. In other cases, the mobile device may download the location improvement data from a centralized server configured to generate the location improvement data.

At block 858, in some embodiments, the mobile device may also display a visual representation of the location improvement data in a display of the mobile device. For example, a visual representation of the location improvement data may be consistent with the shaded regions in the maps shown in FIG. 1, 4, or 6. As another example, the visual representation may be consistent with the numeric values and partitions along the highways in FIG. 5. In some cases, the visual representation of the location improvement data may be overlaid on to a map route visually displayed in the navigation application.

At block 860, the mobile device may track the location of the mobile device along the route toward the determined destination. For example, the mobile device may use the navigation application to receive GPS measurements from various GPS satellites and may continually calculate a location of the mobile device through these measurements. The mobile device may update its estimated location through the navigation application, for example by moving an indicator of its location on a map route in the navigation application.

At block 862, the mobile device may determine a first location along the route. The first location may be determined using standard GPS navigation techniques, consistent with those described throughout the present disclosure. At block 864, the mobile device may determine that the first location matches a location in the location improvement data where sensors are to be turned off during GPS navigation. For example, the mobile device may compare the latitude and longitude coordinates of the first location to an entry in the database that matches or substantially matches the coordinates within some degree of error. The mobile device may analyze a field associated with the matched coordinate and may determine that the field specifies that sensors are to be turned off when at or near the coordinates of the first location. At block 866, the mobile device may therefore turn sensors off so that they are not in use during GPS navigation at or near the first location.

At block 868, the mobile device may determine a second location along the route. The second location may be determined using standard GPS navigation techniques, consistent with those described throughout the present disclosure. At block 870, the mobile device may determine that the second location matches a location in the location improvement data where sensors are to be turned on during GPS navigation. For example, the mobile device may compare the latitude and longitude coordinates of the second location to an entry in the database that a substantially matches the coordinates of the second location within some degree of error. The mobile device may analyze a field associated with the matched coordinate and may determine that the field specifies that the sensors are to be turned on when at or near the coordinates of the second location. At block 872, the mobile device may therefore turn sensors on so that they are in use during GPS navigation at or near the second location.

In some embodiments, the mobile device may cycle back to block 862 to continually compare its current location with coordinates in the location improvement data, in order to determine whether to turn on or off sensors for use in the GPS navigation. This process may repeat continually until the user has reached his destination or otherwise has decided to turn off the navigation application.

Figure 9A:
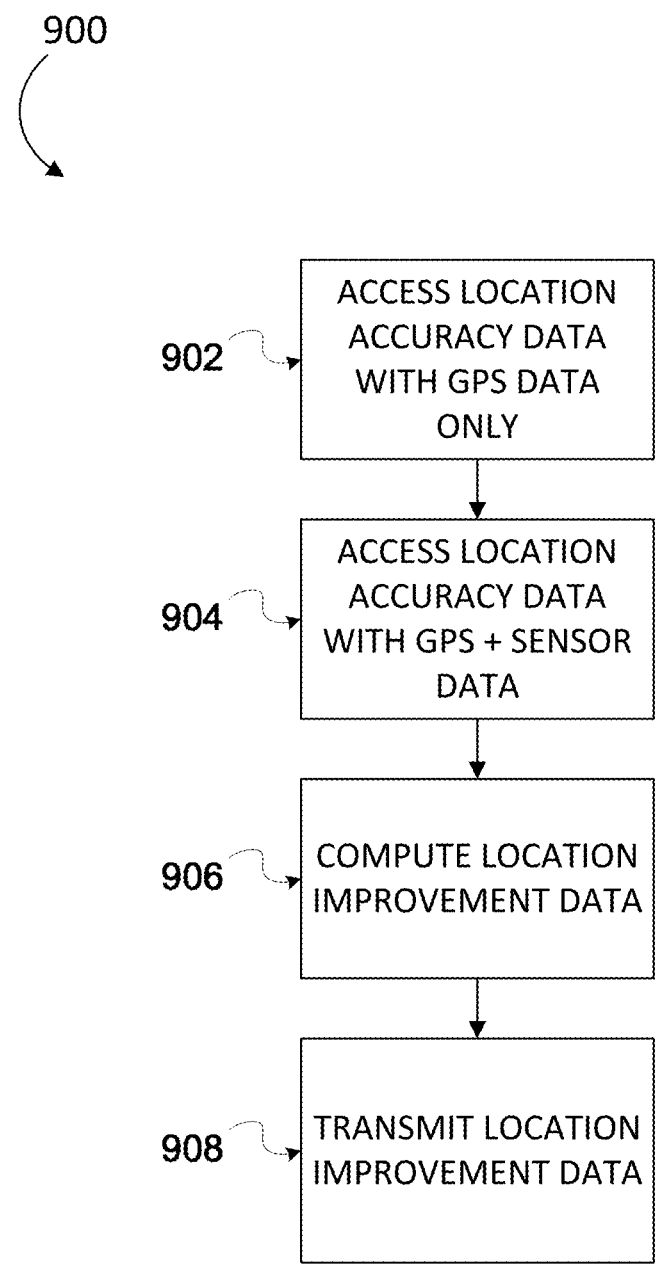
FIGS. 9A-9B represent example methodologies for performing methods of a centralized server, according to aspects of the present disclosure.

Referring to FIG. 9A, flowchart 900 represents a method performed by a centralized server or other computer for generating the location improvement data, according to some embodiments.

At block 902, a centralized server may access location accuracy data based on GPS data without any sensor data. Examples of the location accuracy data may include estimated locations of a mobile device utilizing a GPS navigation program without utilizing sensor data, and associated error estimates as to the accuracy of that estimated location, e.g., the error range 210. In some embodiments, the centralized server may obtain multiple data points of location accuracy data from multiple mobile devices and/or from multiple readings from a single device. In some cases, this data may be stored prior to performing this method, while in other cases, the centralized server may be configured to continuously incorporate new data that is received from multiple mobile devices in a crowdsourcing fashion.

At block 904, the centralized server may also access location in accuracy data based on GPS data and sensor data. Examples of the location accuracy data in block 904 may include estimated locations of a mobile device utilizing a GPS navigation program utilizing sensor data and the associated error estimates, e.g., the error range 240. This data may also be obtained from a common storage body, or may also be continuously updated based on new data received from multiple mobile devices in a crowdsourcing fashion.

At block 906, the centralized server may compute location improvement data based on the location accuracy data with GPS data only and with GPS data plus sensor data, i.e., the data obtained from blocks 902 and 904. The location improvement data may be based on a computed difference in accuracy with the GPS plus sensor data compared to using GPS data only. Examples of the location improvement data may include any of the descriptions herein, including in FIGS. 4-7. In some embodiments, the location improvement data may be expressed in various different ways, including in one or more graphical heat maps, or in one or more charts, consistent with the descriptions herein.

At block 908, the centralized server may then transmit the location improvement data to one or more mobile devices for use in GPS navigation.

Figure 9B:
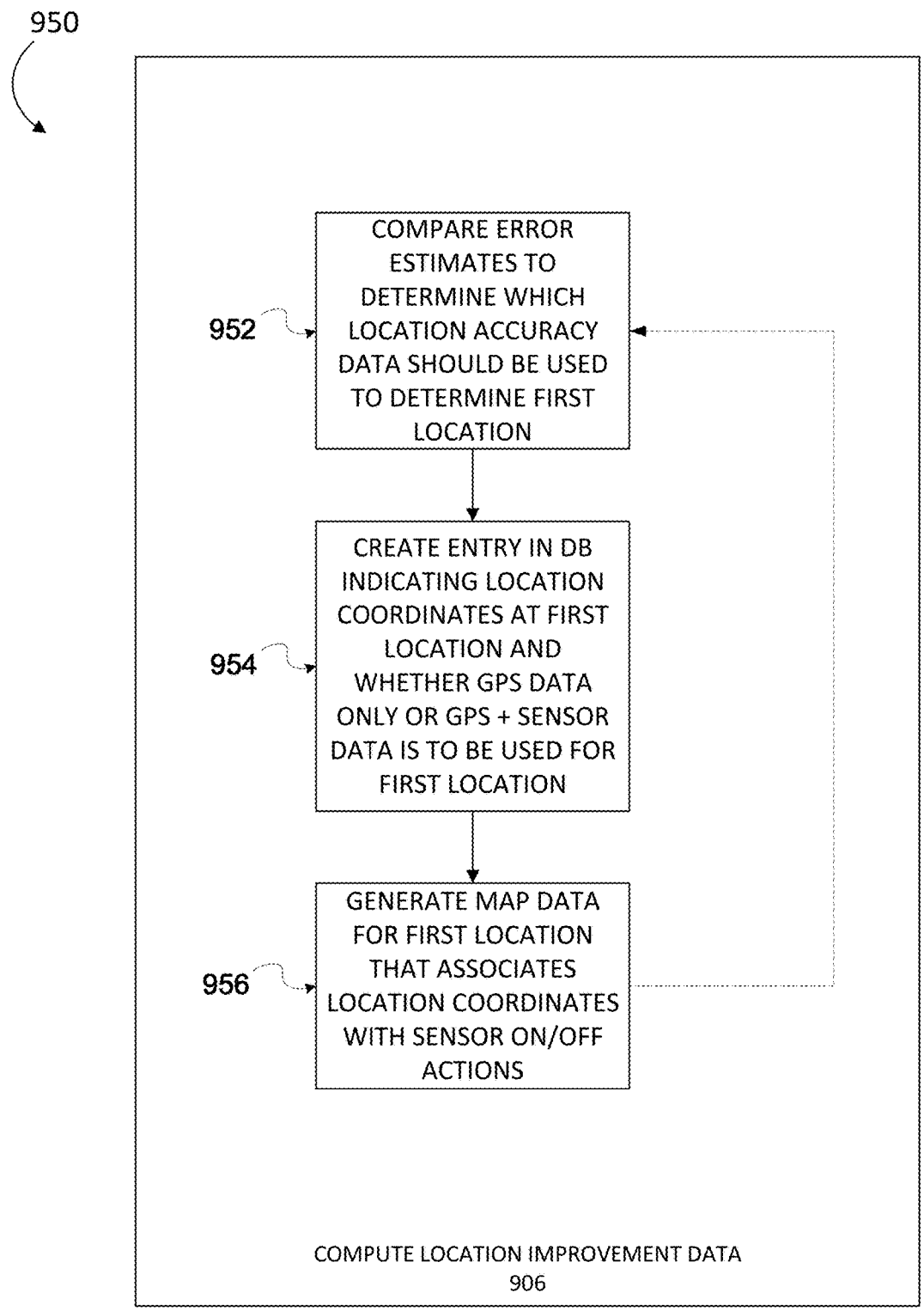

Referring to FIG. 9B, flowchart 950 illustrates additional example methods steps for computing the location improvement data, i.e., block 906, according to some embodiments. For example, at block 952, the server may compare the error estimates between the location accuracy data using only GPS data and the location accuracy data using the GPS plus sensor data to determine which set of location accuracy data should be used to determine a first location. An example of this comparison may include computing a ratio of the error estimates between the two sets of location accuracy data in order to determine how much of an improvement using the GPS plus sensor data is over using only the GPS data to determine the first location. The server may then determine to use the GPS plus sensor data if the comparison e.g., the ratio, satisfies a predetermined threshold percentage improvement. For example, if the comparison reveals that using GPS plus sensor data reduces the error estimate by over 40%, then the server may determine that the GPS plus sensor data should be used to determine the first location. On the other hand, if the comparison reveals that using GPS plus sensor data does not reduce the error estimate by over 40%, the server may determine that only GPS data without sensor data should be used to determine the first location.

At block 954, the server may create an entry in a database (DB) indicating location coordinates at the first location and a flag or other indication declaring whether GPS data only or GPS plus sensor data is to be used for determining the first location. Examples of this entry in the database may include a set of triplet data in charts 700 and 710, where a latitude and longitude coordinate pair designates a first location. In some embodiments, the entry in the DB for the first location may include a designation of whether to turn on sensors, e.g., "green" or "red," while in other cases, the entry in the DB for the first location may include a percentage or fraction indicating how much of an improvement the error estimate at the first location is when sensor data is utilized. In some embodiments, the server may include an entry for the first location into multiple databases, a first DB including a binary designation of whether to turn on sensors, and a second DB including a percentage or fraction indicating how much of an improvement the error estimate at the first location is when sensor data is utilized. Other types of entries into one or more databases for the first location may be consistent with any of the descriptions herein, e.g., "yellow" designation, additional metadata describing types of sensors used, the level of signal strength at the first location, etc., and embodiments are not so limited.

At block 956, in some embodiments, the server may also generate map data for the first location that associates the location coordinates of the first location with sensor on-off actions. Examples of the map data may include the various types of shaded regions on the highways and roads in the maps of FIGS. 1, and 4-6. The server may generate this data based on the location coordinate and designation of the first location stored in one or more of the DB's. Other types of map data may be apparent to those with skill in the art and consistent with the present disclosure, and embodiments are not so limited.

In some embodiments, this process between blocks 952 to 956 may be repeated for multiple locations, e.g., storing information in a DB consistent with the charts 700 or 710. In some embodiments, the server may transmit the DB information and/or the map data information to a mobile device. In some embodiments, the server may provide this location improvement data applied to a wide geographic area where the mobile device is generally utilizing the navigation application, e.g., transmitting location improvement data of a square area of a city in other cases, the server may provide location improvement data applied only to a route along a start and ending location from a route specified in a navigation application of a mobile device. In some embodiments, the server may be configured to compute one or more routes between the start and end location and may transmit to the mobile device location improvement data pertaining to one or more of those routes.

Figure 10:
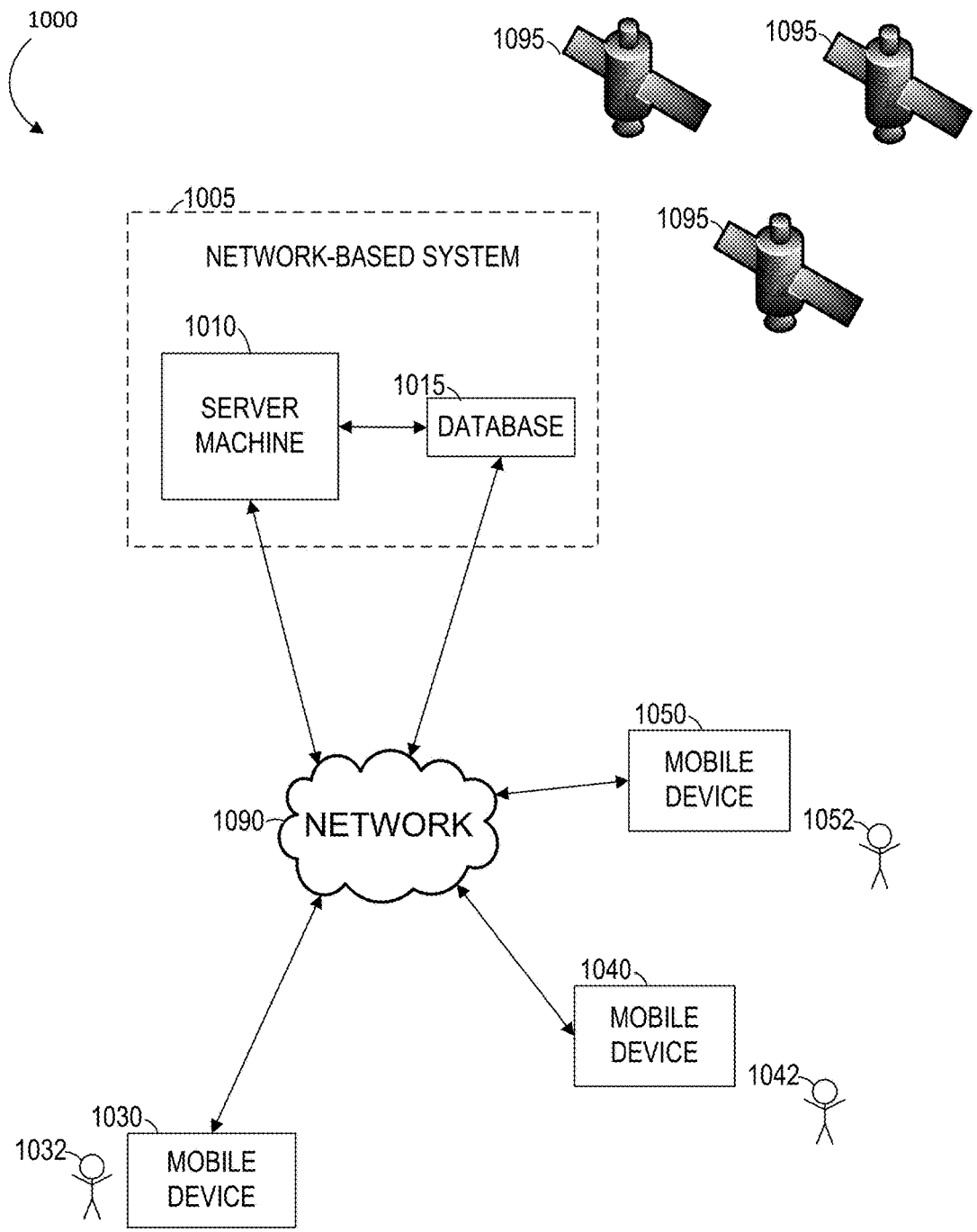
FIG. 10 is a block diagram illustrating an example network environment suitable for performing aspects of the present disclosure.

Referring to FIG. 10, a block diagram illustrating an example network environment 1000 suitable for performing aspects of the present disclosure is shown. The example network environment 1000 includes a server computing device 1010, a database 1015, a first mobile device 1030 for a first user 1032, a second mobile device 1040 for a second user 1042, and a third mobile device 1050 for a third user 1052, all communicatively coupled to each other via a network 1090. The server computing device 1010 may form all or part of a networked-based system 1005 (e.g., a cloud-based server system configured to provide one or more services to the first, second, and third mobile devices 1030, 1040 and 1050). The server computing device 1010, the first mobile device 1030, the second mobile device 1040, and the third mobile device 1050, may each be implemented in a computer system, in whole or in part, as described below with respect to FIG. 11.

Also shown in FIG. 10 are the first user 1032, the second user 1042, and the third user 1052. One or more of the first, second, and third users 1032, 1042, and 1052 may be a human user, a computing device user (e.g., a computer configured by a software program to interact with the first mobile device 1030), or any suitable combination thereof (e.g., a human assisted by a computing device or a computing device supervised by a human). The first user 1032 may be associated with the first mobile device 1030 and may be a user of the first mobile device 1030. For example, the first mobile device 1030 may be a desktop computer, a vehicle computer, a tablet computer, a navigational device, a portable media device, a smartphone, or a wearable device (e.g., a smart watch or smart glasses) belonging to the first user 1032. Likewise, the second user 1042 may be associated with the second mobile device 1040, and the third user 1052 may be associated with the third mobile device 1050. As an example, the third mobile device 1050 may be a desktop computer, a vehicle computer, a tablet computer, a navigational device, a portable media device, a smartphone, or a wearable device (e.g., a smart watch or smart glasses) belonging to the third user 1052.

Any of the computing devices, databases 1015, first, second, or third mobile devices 1030, 1040, or 1050 shown in FIG. 10 may be implemented in a general-purpose computer modified (e.g., configured or programmed) by software (e.g., one or more software modules) to be a special-purpose computer to perform one or more of the functions described herein for that computing device, database 1015, or devices 1030, 1040 or 1050. For example, a computer system able to implement any one or more of the methodologies described herein is discussed below with respect to FIG. 11. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the computing devices, databases, or devices illustrated in FIG. 10 may be combined into a single computing device, and the functions described herein for any single computing device, database, or device may be subdivided among multiple computing devices, databases, or devices.

The network 1090 may be any network that enables communication between or among computing devices, databases 1015, and devices (e.g., the server computing device 1010 and the first mobile device 1030). Accordingly, the network 1090 may be a wired network, a wireless network (e.g., a mobile or cellular network), or any suitable combination thereof. The network 1090 may include one or more portions that constitute a private network, a public network (e.g., the Internet), or any suitable combination thereof. Accordingly, the network 1090 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 1090 may communicate information via a transmission medium. As used herein, "transmission medium" may refer to any intangible (e.g., transitory) medium that is capable of communicating (e.g., transmitting) instructions for execution by a computing device (e.g., by one or more processors of such a computing device), and can include digital or analog communication signals or other intangible media to facilitate communication of such software.

The network-based system 1005 may be an example of the centralized server described in the disclosures herein. Thus, the network-based system 1005 may be configured to perform any of the methodologies discussed herein, based at least in part on data provided from the mobile devices 1030, 1040, and/or 1050. In addition, the network diagram 1000 may also include a plurality of GPS satellites 1095, configured to provide timing information to the mobile devices 1030, 1040, and 1050. The mobile devices 1030, 1040, and/or 1050, may be configured to conduct navigation based on the timing information provided by the GPS satellites 1095.

Figure 11:
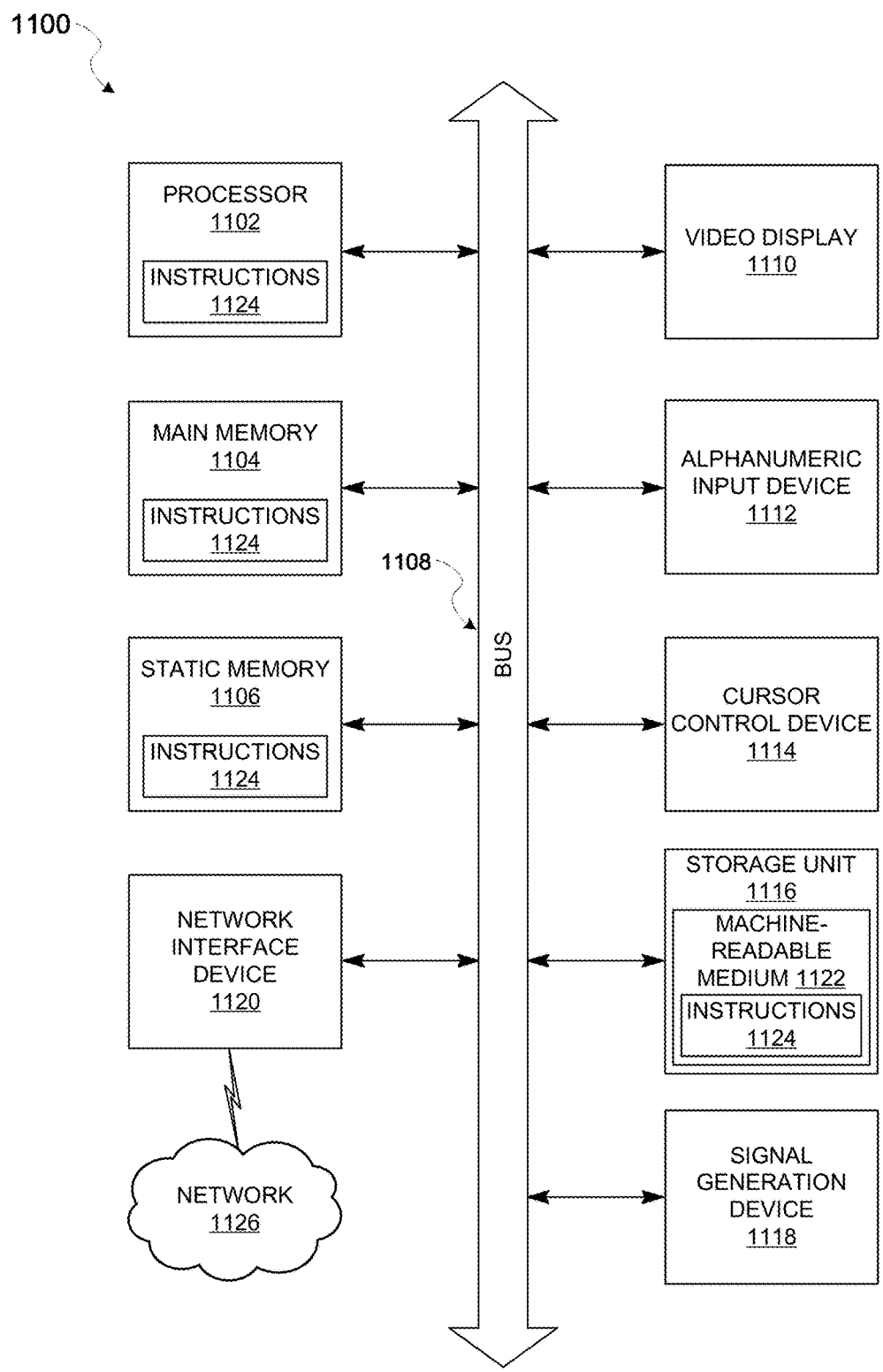
FIG. 11 is a block diagram illustrating components of a mobile device, according to some example embodiments, capable of reading instructions from a machine-readable medium and performing any one or more of the methodologies discussed herein.

Referring to FIG. 11, the block diagram illustrates components of a computing device 1100 (e.g., a server), according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the computing device 1100 in the example form of a computer system (e.g., a computer) within which the instructions 1124 (e.g., software, a program, an application, an applet, an app, or other executable code) for causing the computing device 1100 to perform any one or more of the methodologies discussed herein may be executed, in whole or in part.

In alternative embodiments, the computing device 1100 operates as a stand-alone device or may be connected (e.g., networked) to other computing devices. In a networked deployment, the computing device 1100 may operate in the capacity of a server computing device 1010 or a client computing device in a server-client network environment, or as a peer computing device in a distributed (e.g., peer-to-peer) network environment. The computing device 1100 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any computing device capable of executing the instructions 1124, sequentially or otherwise, that specify actions to be taken by that computing device. Further, while only a single computing device 1100 is illustrated, the term "computing device" shall also be taken to include any collection of computing devices that individually or jointly execute the instructions 1124 to perform all or part of any one or more of the methodologies discussed herein.

The computing device 1100 includes a processor 1102 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The computing device 1100 may further include a video display 1110 (e.g., a plasma display panel (PDP), a light-emitting diode (LED) display, a liquid crystal display (LCD), a projector, a cathode ray tube (CRT), or any other display capable of displaying graphics or video). The computing device 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein, including, for example, any of the descriptions of FIGS. 1-10. The instructions 1124 may also reside, completely or at least partially, within the main memory 1104, within the processor 1102 (e.g., within the processor's cache memory), or both, before or during execution thereof by the computing device 1100. The instructions 1124 may also reside in the static memory 1106.

Accordingly, the main memory 1104 and the processor 1102 may be considered machine-readable media 1122 (e.g., tangible and non-transitory machine-readable media). The instructions 1124 may be transmitted or received over a network 1126 via the network interface device 1120. For example, the network interface device 1120 may communicate the instructions 1124 using any one or more transfer protocols (e.g., HTTP). The computing device 1100 may also represent example means for performing any of the functions described herein, including the processes described in FIGS. 1-10.

In some example embodiments, the computing device 1100 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory.

While the machine-readable medium 1122 is shown in an example embodiment to be a single medium, the term "machine-readable medium" should be taken to include a single medium or multiple media (e.g., a centralized or distributed database 1015, or associated caches and servers) able to store instructions 1124. The term "machine-readable medium" shall also be taken to include any medium, or combination of multiple media, that is capable of storing the instructions 1124 for execution by the computing device 1100, such that the instructions 1124, when executed by one or more processors of the computing device 1100 (e.g., processor 1102), cause the computing device 1100 to perform any one or more of the methodologies described herein, in whole or in part. Accordingly, a "machine-readable medium" refers to a single storage apparatus or device 1030, 1040, or 1050, as well as cloud-based storage systems or storage networks that include multiple storage apparatus or devices 1030, 1040 or 1050. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1122 is non-transitory in that it does not embody a propagating signal. However, labeling the tangible machine-readable medium 1122 as "non-transitory" should not be construed to mean that the medium is incapable of movement; the medium should be considered as being transportable from one physical location to another. Additionally, since the machine-readable medium 1122 is tangible, the medium may be considered to be a machine-readable device.

Figure 12:
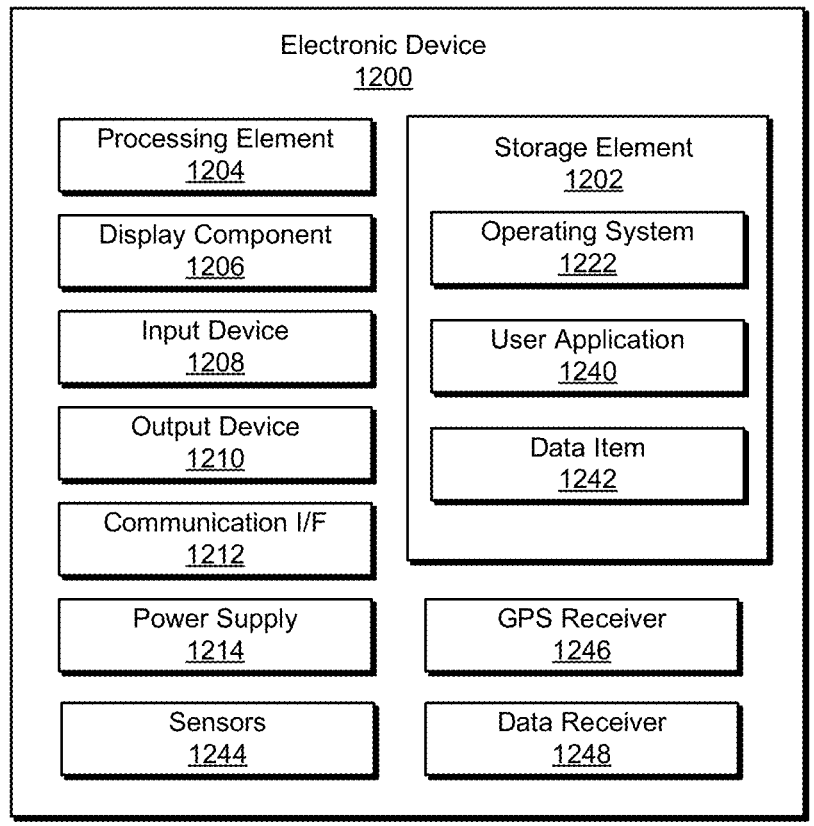
FIG. 12 is a block diagram of an example electronic device, configured to perform methods according to aspects of the present disclosure.

Referring to FIG. 12, an example block diagram of an electronic device 1200 is illustrated, in accordance with aspects of the present disclosure. The electronic device 1200 may be any of mobile devices 1030, 1040, 1050, the network-based system 1005, or the like. The electronic device 1200 may be implemented as any of a number of electronic devices, such as an e-book reader, a tablet computing device, a smartphone, a media player, a portable gaming device, a portable digital assistant, a laptop computer, a desktop computer, and other devices providing GPS navigation functionality. It should be understood that various types of computing devices including a processing element, a memory, and a user interface for receiving user input can be used in accordance with various embodiments discussed herein.

The electronic device 1200 may include a display component 1206. The display component 1206 may comprise, for example, one or more devices such as cathode ray tubes (CRTs), liquid crystal display (LCD) screens, gas plasma-based flat panel displays, LCD projectors, or other types of display devices, etc. The electronic device 1200 may include one or more input devices 1208 operable to receive inputs from a user. The input devices 1208 can include, for example, a push button, touch pad, touch screen, wheel, joystick, keyboard, mouse, trackball, keypad, accelerometer, light gun, game controller, or any other such device or element whereby a user can provide inputs to the electronic device 1200. These input devices 1208 may be incorporated into the electronic device 1200 or operably coupled to the electronic device 1200 via wired or wireless interface. For computing devices with touch sensitive displays, the input devices 1208 can include a touch sensor that operates in conjunction with the display component 1206 to permit users to interact with the image displayed by the display component 1206 using touch inputs (e.g., with a finger or stylus). The electronic device 1200 may also include an output device 1210, such as one or more audio speakers.

The electronic device 1200 may also include at least one communication interface 1212 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 1200 may also include one or more wired communications interfaces for coupling and communicating with other devices, such as a USB port. The electronic device 1200 may also include a power supply 1214, such as, for example, a rechargeable battery operable to be recharged through conventional plug-in approaches, or through other approaches such as capacitive charging.

The electronic device 1200 may also include a processing element 1204 for executing instructions and retrieving data stored in a storage element 1202 or memory. As would be apparent to one of ordinary skill in the art, the storage element 1202 can include one or more different types of memory, data storage or computer-readable storage media, such as, for example, a first data storage for program instructions for execution by the processing element 1204, and a second data storage for images or data and/or a removable storage for transferring data to other devices. The storage element 1202 may store software for execution by the processing element 1204, such as, for example, operating system software 1222 and user applications 1240. An example of user application 1240 may include a navigation application. The storage element 1202 may also store a data item 1242, such as, for example, data files corresponding to one or more applications 1240.

The electronic device 1200 may also include one or more sensors 1244 configured to generate sensor data. The sensors 1244 may include inertial sensors, such as accelerometers and gyroscopes. The sensors 1244 may also include barometers, radar, audio sensors, and the like. The electronic device 1200 may also include a GPS receiver 1246 configured to receive timing measurements from one or more GPS satellites. The timing measurements may be processed by the processing element 1204 to estimate a location of the electronic device 1200. The electronic device may also include a data receiver 1248. The data receiver 1248 may be configured to receive wireless signals from a server or other data transmitting entity. For example, the data receiver may be configured to receive location improvement data from a server, such as network-based system 1005.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1122 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor 1102 or a group of processors 1102) may be configured by software (e.g., an application or application portion) as a hardware module that operates to perform certain operations as described herein.

In some embodiments, a hardware module may be implemented mechanically, electronically, or in any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor 1102 or other programmable processor 1102. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1108) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions described herein. As used herein, "processor-implemented module" refers to a hardware module implemented using one or more processors 1102.

Similarly, the methods described herein may be at least partially processor-implemented, a processor 1102 being an example of hardware. For example, at least some of the operations of a method may be performed by one or more processors 1102 or processor-implemented modules. As used herein, "processor-implemented module" refers to a hardware module in which the hardware includes one or more processors 1102. Moreover, the one or more processors 1102 may also operate to support performance of the relevant operations in a "cloud computing" environment or as a "software as a service" (SaaS). For example, at least some of the operations may be performed by a group of computers (as examples of computing devices 1100 including processors 1102), with these operations being accessible via a network 1126 (e.g., the Internet) and via one or more appropriate interfaces (e.g., application program interface (API)).

The performance of certain operations may be distributed among the one or more processors 1102, not only residing within a single computing device 1100, but deployed across a number of computing devices 1100. In some example embodiments, the one or more processors 1102 or processor-implemented modules may be located in a single geographic location (e.g., within a home environment, an office environment, or a server farm). In other example embodiments, the one or more processors 1102 or processor-implemented modules may be distributed across a number of geographic locations.

Unless specifically stated otherwise, discussions herein using words such as "processing," "computing," "calculating," "determining," "presenting," "displaying," or the like may refer to actions or processes of a computing device 1100 (e.g., a computer) that manipulates or transforms data represented as physical (e.g., electronic, magnetic, or optical) quantities within one or more memories (e.g., volatile memory, non-volatile memory, or any suitable combination thereof), registers, or other computing device components that receive, store, transmit, or display information. Furthermore, unless specifically stated otherwise, the terms "a" or "an" are herein used, as is common in patent documents, to include one or more than one instance. Finally, as used herein, the conjunction "or" refers to a nonexclusive "or," unless specifically stated otherwise.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

The present disclosure is illustrative and not limiting. It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. Further modifications will be apparent to one skilled in the art in light of this disclosure and are intended to fall within the scope of the appended claims.

What is claimed is:

1. A method of operating a mobile device, the method comprising:
    receiving location improvement data for a geographic location, the location improvement data including a value corresponding to improvement in accuracy for location data for the geographic location, wherein the value is determined by:
        computing a first error range of first location data for the geographic location generated using a Global Positioning System (GPS) receiver in combination with sensor data;
        computing a second error range of second location data for the geographic location generated using only the GPS receiver; and
        computing a margin of improvement between the first error range and the second error range;
    determining that the value is equal to or greater than a sensor enablement threshold criterion for the geographic location; and
    enabling one or more sensors for use in location determination when at or near the geographic location.

2. The method of claim 1, further comprising:
    enabling one or more inertial sensors including an accelerometer or a gyroscope or a barometer.

3. The method of claim 1, further comprising:
    receiving location improvement data for the geographic location, the location improvement data including the value corresponding to a percentage proportionate to how much more accurate the first location data is at the geographic location compared to the second location data at the geographic location.

4. The method of claim 1, further comprising:
    receiving location improvement data comprising map data indicative of a first map of a geographic region including the geographic location, the map data comprising at least one designation to be overlaid on a visual representation of the geographic region, a first designation of the at least one designation prescribing utilization of the sensor data in combination with GPS navigation when navigating in a first location in an area overlaid by the first designation.

5. The method of claim 4, wherein the at least one designation includes a second designation overlaid in a first non-overlapping area with the first designation on the visual representation of the geographic region and prescribing use of GPS navigation without utilizing the sensor data when navigating in a second location in an area overlaid by the second designation.

6. The method of claim 5, wherein the at least one designation includes a third designation overlaid in a second non-overlapping area with the first and second designations on the visual representation of the geographic region and prescribing:
    utilization of sensor data in combination with GPS navigation when navigating in a third location in an area overlaid by the third designation and when a first condition is satisfied; and
    non-utilization of the sensor data with GPS navigation when navigating in the third location and when the first condition is not satisfied.

7. The method of claim 6, wherein the first condition comprises a determination that a battery life of the mobile device exceeds a predetermined threshold.

8. The method of claim 6, wherein the first condition comprises a determination that GPS signals from fewer than five GPS satellites are being received by the mobile device.

9. The method of claim 6, wherein the first condition comprises a determination that a signal strength of a GPS satellite at the mobile device exceeds a predetermined threshold.

10. The method of claim 1, further comprising:
    receiving location improvement data comprising data indicative of a second map of the geographic region including the geographic location, the second map comprising a first value indicative of a first increase in accuracy of the first estimated location, at the geographic location, over the second estimated location, at the geographic location.

11. The method of claim 10, further comprising:
receiving location improvement data comprising data indicative of a third map of the geographic region including the geographic location, the third map comprising a second value indicative of a second increase in accuracy of the first estimated location, at the geographic location, over the second estimated location, at the geographic location, when the mobile device satisfies a navigation condition.

12. The method of claim 11, wherein the navigation condition comprises a determination that a signal strength from a GPS satellite falls below a predetermined threshold.

13. The method of claim 11, wherein the navigation condition comprises a determination that the mobile device receives GPS data from fewer than a predetermined number of GPS satellites.

14. A mobile device comprising:
a global positioning system (GPS) receiver configured to provide timing measurements for use in a GPS navigation application;
a data receiver;
one or more sensors configured to provide sensor data; and
a processor operatively coupled to the GPS receiver, the data receiver, and the one or more sensors;
wherein the data receiver is configured to:
receive location improvement data for a geographic location, the location improvement data including a value corresponding to improvement in accuracy for location data for the geographic location, wherein the value is determined by:
computing a first error range of first location data for the geographic location generated using a Global Positioning System (GPS) receiver in combination with sensor data;
computing a second error range of second location data for the geographic location generated using only the GPS receiver; and
computing a margin of improvement between the first error range and the second error range;
wherein the processor is configured to:
determine that the value is equal to or greater than a sensor enablement threshold criterion for the geographic location; and
enable the one or more sensors for use in location determination when at or near the geographic location.

15. The mobile device of claim 14, wherein the value comprises a percentage proportionate to how much more accurate the first location data is at the geographic location compared to the second location data at the geographic location.

16. The mobile device of claim 14, wherein the location improvement data comprises map data indicative of a first map of a geographic region including the geographic location, the map data comprising:
at least one designation to be overlaid on a visual representation of the geographic region, a first designation of the at least one designation prescribing utilization of the sensor data in combination with the GPS navigation application when navigating in a first location in an area overlaid by the first designation; and
a second designation overlaid in a first non-overlapping area with the first designation on the visual representation of the geographic region and prescribing use of GPS navigation without utilizing the sensor data when navigating in a second location in an area overlaid by the second designation.

17. The mobile device of claim 16, wherein the at least one designation includes a third designation overlaid in a second non-overlapping area with the first and second designations on the geographic region and prescribing:
utilization of sensor data in combination with the GPS navigation application when navigating in an area overlaid by the third designation and when a first condition is satisfied; and
non-utilization of sensor data with the GPS navigation application when navigating in the third location and when the first condition is not satisfied.

18. The mobile device of claim 14, wherein the one or more sensors comprises an accelerometer, a gyroscope, or a barometer.

19. The mobile device of claim 14, wherein the location improvement data comprises data indicative of a second map of the geographic region including the geographic location, the second map comprising a first value indicative of a first increase in accuracy of the first estimated location, at the geographic location, over the second estimated location, at the geographic location.

20. The mobile device of claim 19, wherein the location improvement data comprises data indicative of a third map of the geographic region including the geographic location, the third map comprising a second value indicative of a second increase in accuracy of the first estimated location, at the geographic location, over the second estimated location, at the geographic location, when the mobile device satisfies a navigation condition.

21. A method of operating a mobile device, the method comprising:
receiving location improvement data for a geographic location, the location improvement data including:
a value corresponding to improvement in accuracy for location data for the geographic location, wherein the value is determined by comparing first location data for the geographic location generated using a Global Positioning System (GPS) receiver in combination with sensor data and second location data for the geographic location generated using only the GPS receiver;
map data indicative of a first map of a geographic region including the geographic location, the map data comprising:
at least one designation to be overlaid on a visual representation of the geographic region;
a first designation of the at least one designation prescribing utilization of the sensor data in combination with GPS navigation when navigating in a first location in an area overlaid by the first designation;
a second designation of the at least one designation overlaid in a first non-overlapping area with the first designation on the visual representation of the geographic region and prescribing use of GPS navigation without utilizing the sensor data when navigating in a second location in an area overlaid by the second designation; and
a third designation of the at least one designation overlaid in a second non-overlapping area with the first and second designations on the visual representation of the geographic region and prescribing:
utilization of sensor data in combination with GPS navigation when navigating in a third location in an area overlaid by the third designation and when a first condition is satisfied; and
non-utilization of the sensor data with GPS navigation when navigating in the third location and when the first condition is not satisfied;
determining that the value is equal to or greater than a sensor enablement threshold criterion for the geographic location; and
enabling one or more sensors for use in location determination when at or near the geographic location.

* * * * *